(12) United States Patent
Austrheim et al.

(10) Patent No.: US 12,329,079 B2
(45) Date of Patent: Jun. 17, 2025

(54) STACKABLE GROWTH MODULE FOR SUPPORTING PLANTS IN A VERTICAL FARMING SYSTEM

(71) Applicant: Autostore Technology AS, Nedre Vats (NO)

(72) Inventors: Trond Austrheim, Etne (NO); Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 18/325,877

(22) Filed: May 30, 2023

(65) Prior Publication Data
US 2024/0373804 A1    Nov. 14, 2024

Related U.S. Application Data

(63) Continuation-in-part of application No. 18/316,859, filed on May 12, 2023.

(51) Int. Cl.
*A01G 31/06* (2006.01)

(52) U.S. Cl.
CPC .................. *A01G 31/06* (2013.01)

(58) Field of Classification Search
CPC ........ A01G 31/06; A01G 31/02; A01G 7/045; A01G 9/025; A01G 9/047; A01G 27/008;
(Continued)

(56) References Cited

U.S. PATENT DOCUMENTS

| 6,840,008 B1 | 1/2005 | Bullock et al. |
| 7,788,848 B1 | 9/2010 | Koumoudis |

(Continued)

FOREIGN PATENT DOCUMENTS

| CN | 107223015 A1 | 9/2017 |
| CN | 113141913 A | 7/2021 |

(Continued)

OTHER PUBLICATIONS

Anonymous, Official letter of pending patent application under examination, with accompanying search report for Taiwan patent application No. 113117644, in Taiwan-style Chinese with English translation, pub. Feb. 12, 2025 by Taiwan Intellectual Property Office, Ministry of Economic Affairs, 25 pages inclusive of translation.

(Continued)

*Primary Examiner* — Ebony E Evans
(74) *Attorney, Agent, or Firm* — Baker Botts L.L.P.

(57) ABSTRACT

A stackable module has a functional component. The stackable module has a load-bearing frame including a first support member and a second support member held in a spaced apart and parallel configuration by a cross-member. The cross-member forms a part of the functional component. The load-bearing frame is configured to enable the stackable module to occupy a cuboidal volume within which the functional component is supported, and wherein the load-bearing frame includes upper and lower load-transferring edge surfaces. The functional component may be a growth board for supporting plants in a vertical farming system, the growth board having a drain.

10 Claims, 27 Drawing Sheets

(58) Field of Classification Search
CPC ........ A01G 27/04; A01G 27/02; A01G 31/04; E04B 1/00; E04B 1/80
USPC ...................................................... 47/39, 64
See application file for complete search history.

(56) References Cited

U.S. PATENT DOCUMENTS

| | | |
|---|---|---|
| 8,966,819 B1 | 3/2015 | Cosmann |
| 10,172,296 B2 | 1/2019 | Krijn et al. |
| 10,196,209 B2 | 2/2019 | Lindbo et al. |
| 10,549,914 B2 | 2/2020 | Clarke et al. |
| 11,053,073 B2 | 7/2021 | Clarke et al. |
| 11,524,844 B2 | 12/2022 | Clarke et al. |
| 11,596,109 B2 | 3/2023 | Fonseca Dos Reis et al. |
| 11,622,512 B2 | 4/2023 | Chong |
| 2003/0005626 A1 | 1/2003 | Yoneda et al. |
| 2009/0119987 A1 | 5/2009 | Ingrassia |
| 2012/0324788 A1 | 12/2012 | Sakura et al. |
| 2014/0109473 A1* | 4/2014 | Sung ............... A01G 9/022 47/39 |
| 2014/0191633 A1 | 7/2014 | Zhu et al. |
| 2015/0289452 A1* | 10/2015 | Axley ............... F28C 3/06 47/65.5 |
| 2016/0212947 A1 | 7/2016 | Uchiyama |
| 2017/0006788 A1* | 1/2017 | Hashimoto ........ A01G 9/0295 |
| 2017/0027110 A1 | 2/2017 | Ito et al. |
| 2018/0000027 A1 | 1/2018 | Rodrigues |
| 2018/0035625 A1 | 2/2018 | Lindbo et al. |
| 2018/0170650 A1 | 6/2018 | Lindbo et al. |
| 2018/0199526 A1* | 7/2018 | Guo ............... A01G 31/02 |
| 2018/0317410 A1 | 11/2018 | Spiro |
| 2019/0029194 A1 | 1/2019 | Wilhelmus |
| 2019/0246571 A1 | 8/2019 | Ingram-Tedd et al. |
| 2020/0154660 A1 | 5/2020 | Cuello |
| 2021/0307268 A1 | 10/2021 | Lloyd-Jones et al. |
| 2022/0061232 A1 | 3/2022 | Whelan et al. |
| 2022/0217919 A1 | 7/2022 | Whelan |
| 2022/0400635 A1 | 12/2022 | Howe |
| 2023/0263104 A1* | 8/2023 | Wegenast ........... A01G 9/025 47/83 |
| 2023/0354754 A1 | 11/2023 | Spiro |
| 2023/0354759 A1* | 11/2023 | Choi ............... A01G 31/06 |

FOREIGN PATENT DOCUMENTS

| | | |
|---|---|---|
| DE | 102020008105 A1 | 3/2022 |
| EP | 2308283 A1 | 4/2011 |
| EP | 3127422 A1 | 2/2017 |
| EP | 3326452 B1 | 6/2020 |
| GB | 2607365 A | 12/2022 |
| JP | H01-256325 A | 10/1989 |
| JP | H07-111828 A | 5/1995 |
| JP | H10-136790 A | 5/1998 |
| JP | H11-275972 A | 10/1999 |
| JP | 2000-209970 A | 8/2000 |
| JP | 2002-095355 A | 4/2002 |
| JP | 2004-121074 A | 4/2004 |
| KR | 20150003480 U | 9/2015 |
| KR | 20220094598 A | 7/2022 |
| NO | B17366 B1 | 10/2004 |
| NO | 346913 B1 | 2/2023 |
| NO | 20211565 A1 | 2/2023 |
| WO | 2012/132646 A1 | 10/2012 |
| WO | 2014/075937 A1 | 5/2014 |
| WO | 2014/090684 A1 | 6/2014 |
| WO | 2015/105426 A1 | 7/2015 |
| WO | 2015/193278 A1 | 12/2015 |
| WO | 2016/166311 A1 | 10/2016 |
| WO | 2016/166353 A1 | 10/2016 |
| WO | 2016/166354 A1 | 10/2016 |
| WO | 2018/050816 A1 | 3/2018 |
| WO | 2018/073392 A1 | 4/2018 |
| WO | 2018/146304 A1 | 8/2018 |
| WO | 2019006019 A1 | 1/2019 |
| WO | 2019/109006 A1 | 6/2019 |
| WO | 2019/206487 A1 | 10/2019 |
| WO | 2020/030825 A1 | 2/2020 |
| WO | 2020/144269 A1 | 7/2020 |
| WO | 2020/211926 A1 | 10/2020 |
| WO | 2020/234444 A1 | 11/2020 |
| WO | 2021/116115 A1 | 6/2021 |
| WO | 2021/116116 A1 | 6/2021 |
| WO | 2021/234144 A1 | 11/2021 |
| WO | 2022/033886 A1 | 2/2022 |
| WO | 2022/033889 A1 | 2/2022 |
| WO | 2022/033890 A1 | 2/2022 |
| WO | 2022/106602 A1 | 5/2022 |
| WO | 2022/120119 A1 | 6/2022 |
| WO | 2022/175341 A1 | 8/2022 |
| WO | 2022/175416 A1 | 8/2022 |
| WO | 2022/248264 A1 | 12/2022 |
| WO | 2022/251945 A1 | 12/2022 |
| WO | 2022/253844 A1 | 12/2022 |
| WO | 2023/046519 A1 | 3/2023 |
| WO | 2023/066849 A1 | 4/2023 |

OTHER PUBLICATIONS

Anonymous, Official letter of pending patent application under examination, with accompanying search report for Taiwan patent application No. 113117643, in Taiwan-style Chinese with English translation, pub. Feb. 18, 2025 by Taiwan Intellectual Property Office, Ministry of Economic Affairs, 16 pages inclusive of translation.

Arnaud Benedetti, International Search Report and Written Opinion for Application No. PCT/EP2024/063094 mailed Aug. 14, 2024, International Searching Authority, European Patent Office, Rijswijk, Netherlands, 13 pages.

Kristen C Hayes, Non-final Office Action for U.S. Appl. No. 18/316,859 mailed Mar. 6, 2025, US Patent and Trademark Office, Alexandria, Virginia, US, 9 pages.

Bruno Gatinet, International Search Report and Written Opinion for Application No. PCT/EP2024/063078 mailed Sep. 6, 2024, International Searching Authority, European Patent Office, Rijswijk, Netherlands, 12 pages.

Anonymous, Notice of Examination Opinion for Taiwan patent application No. 113117645, in Taiwan-style Chinese with English translation, pub. Mar. 13, 2025 by Taiwan Intellectual Property Office, Ministry of Economic Affairs, 26 pages inclusive of translation.

Jan Boon, International Search Report and Written Opinion for International application No. PCT/EP2024/063124 mailed Aug. 8, 2024, 15 pages, International Searching Authority, European Patent Office, Rijswijk, Netherlands.

* cited by examiner

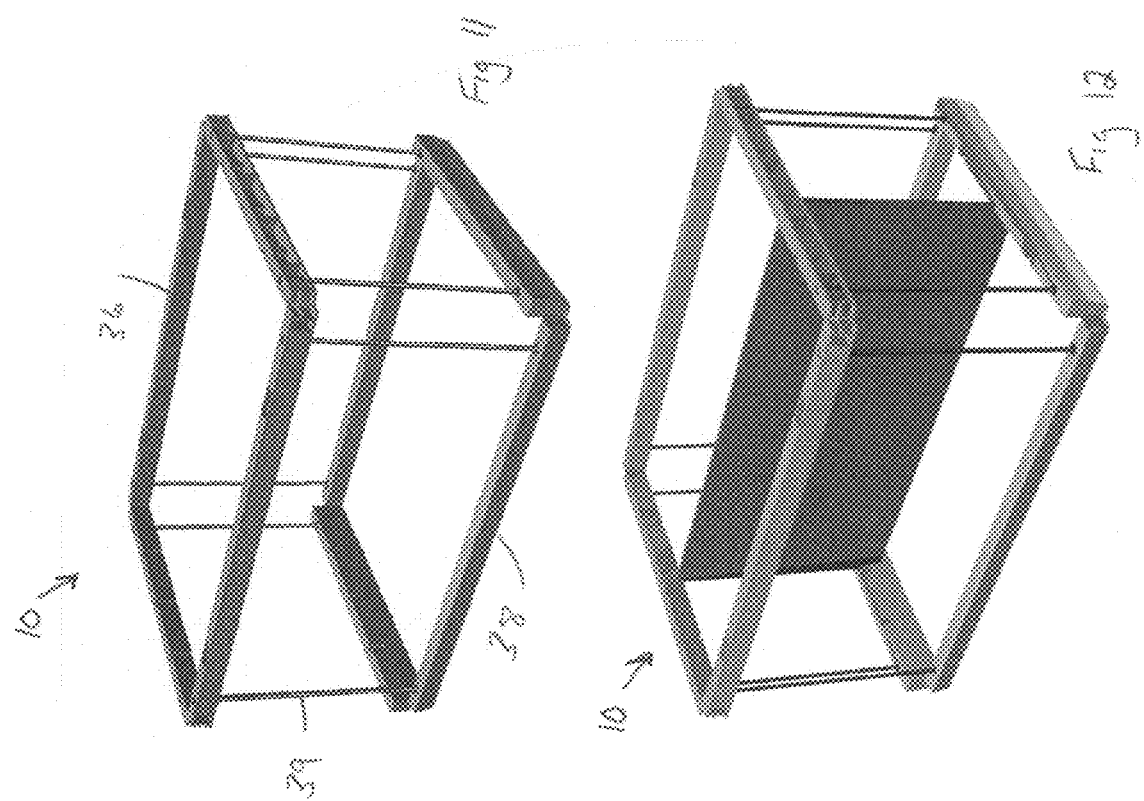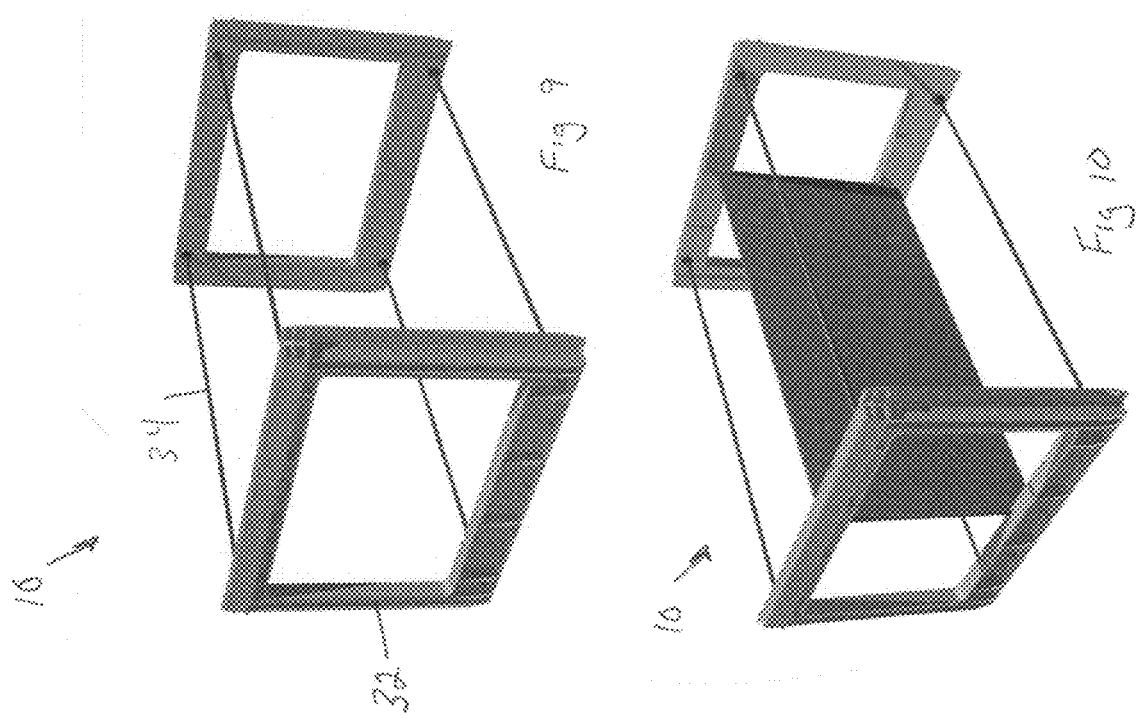

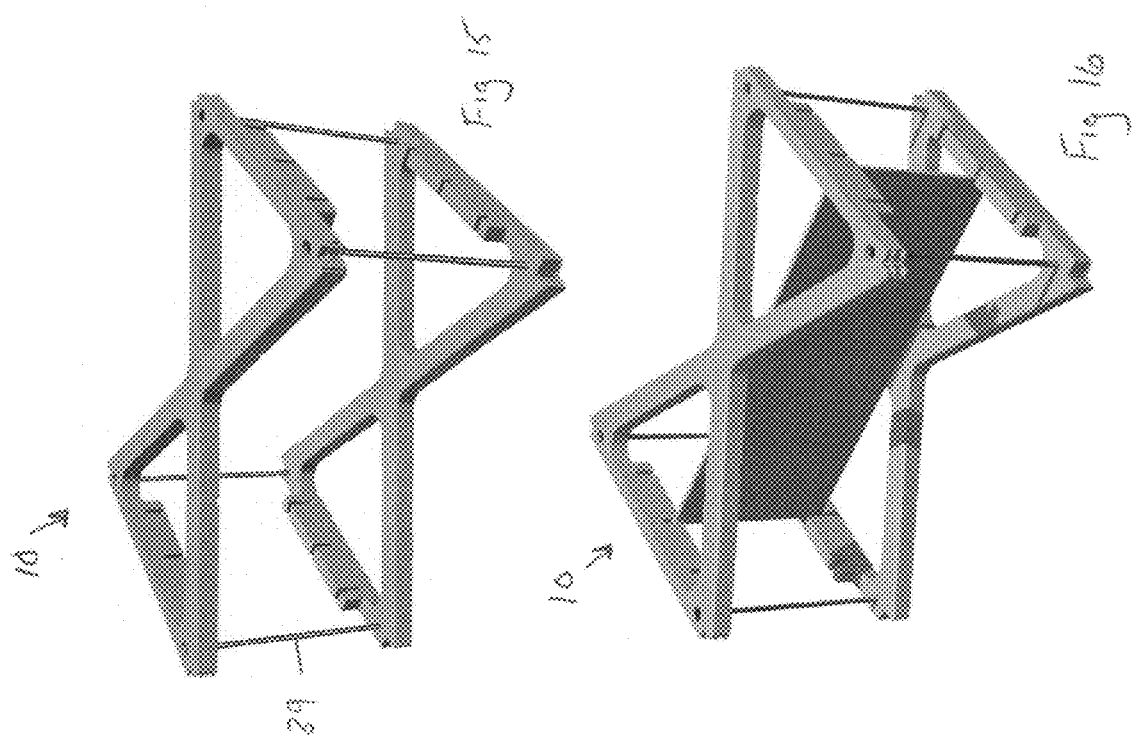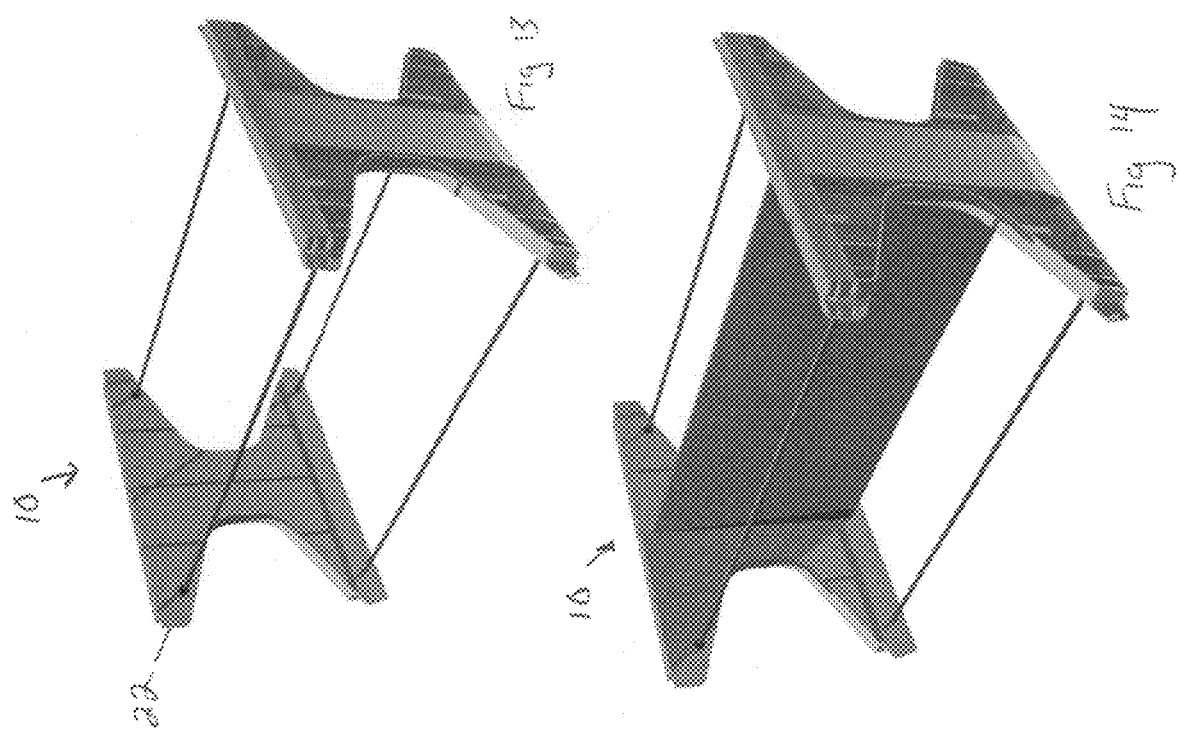

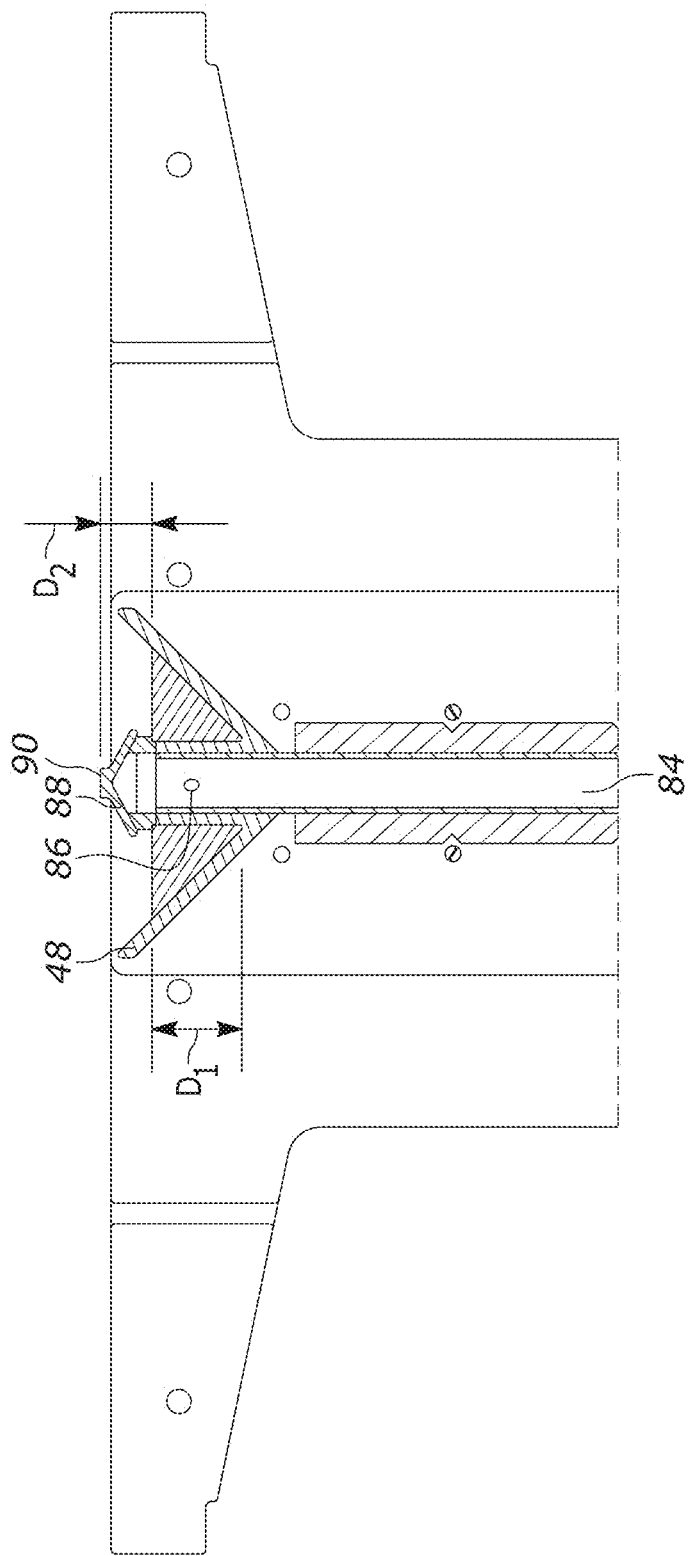

STACKABLE GROWTH MODULE FOR SUPPORTING PLANTS IN A VERTICAL FARMING SYSTEM

FIELD OF THE INVENTION

The present invention relates to vertical farming, more particularly to a vertical farming system and related components based on the infrastructure and control systems of an automated storage and retrieval system.

BACKGROUND AND PRIOR ART

Automated Storage and Retrieval Systems

Automated storage and retrieval systems, otherwise known as "cube storage systems" or "grid storage systems" are known. One such prior art system by the present applicant is described below.

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201a,301a,401a and first and second sets of wheels 201b, 201c. 301b, 301c,401b,401c which enable the lateral movement of the container handling vehicles 201,301,401 in the X direction and in the Y direction, respectively. In FIGS. 2, 3 and 4 two wheels in each set are fully visible. The first set of wheels 201b,301b, 401b is arranged to engage with two adjacent rails of the first set 110 of rails, and the second set of wheels 201c,301c,401c is arranged to engage with two adjacent rails of the second set 111 of rails. At least one of the sets of wheels 201b, 201c, 301b,301c,401b,401c can be lifted and lowered, so that the first set of wheels 201b,301b,401b and/or the second set of wheels 201c,301c,401c can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body 201a in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1. Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201a,401a as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110,111 may comprise two parallel tracks. In other rail systems 108, each rail in one direction (e.g. an X direction) may comprise one track and each rail in the other, perpendicular direction (e.g. a Y direction) may comprise two tracks. Each rail 110,111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns are storage columns 105, i.e. columns 105 where storage containers 106 are stored in stacks 107. In addition to storage columns 105, there are special-purpose columns within the framework structure. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

Vertical Farming

The term "vertical farming" refers to a system for growing plants, typically indoors, in a facility in which the growing plants are arranged in vertically stacked layers in a compact and space-saving manner. Vertical farming systems are often automated to some degree, with various tasks and controls being performed by automated machines or control systems. The purpose of the vertical arrangement of the growing plants is to utilize a third dimension of space in order to generate a higher crop yield for a given two-dimensional unit area.

Some vertical farming systems grow the plants in soil, whereas other systems are based on hydroponics, which refers to a technique of growing plants without soil.

It is further known to arrange a vertical farming system in a framework structure similar to that of an automated storage and retrieval system, in which plants are grown in storage containers stored in stacks and in which automated container handling vehicles lift and transport the containers holding the plants for various purposes. Such systems are exemplified by the following patents and patent applications publications:

US2018/0035625; US2019/0246571; U.S. Pat. Nos. 10,549,914; 11,524,844; 10,196,209; US2018/0170650, WO2022/033886

Common for the above-mentioned prior art systems is that the containers in which the plants grow comprise a horizontal growth tray, where the plants grow vertically from the horizontal tray. In the first instance, using containers in the form of a rigid box structure creates problems in terms of manufacture and transport of such containers to the vertical farm facility. Rigid, box-shaped containers occupy a relatively large volume, making the transport and storage of such containers difficult and expensive. Furthermore, arranging such box-shaped containers with vertically growing plants in stacks is not an optimal solution, as providing lighting, water and airflow to such vertical stacks of vertically growing plants is difficult and cumbersome.

There is therefore a need for a vertical farming system that improves the receptacles in which the plants are grown, that improves the arrangement for watering the plants and that avoids the problem of water dripping into the tracks of the rail system on which automated vehicles of the system operate, as well as improvements in providing lighting, nutrients and airflow to the growing plants.

SUMMARY OF THE INVENTION

The present invention is set forth and characterized in the independent claims, while the dependent claims describe other characteristics of the invention.

In one aspect, the invention relates to a stackable module, and in particular to a stackable growth module for supporting growing plants in a vertical farming system. Versions of the stackable module may be used to support other functions, like watering and drainage, to assist the vertical farming system. A stackable water tank module providing a water supply for the growth modules and a stackable spacer module providing drainage below the growth modules are also provided herein.

The invention can be seen as providing a modular vertical farming system where stackable modules are deployed in stacks within columns of a framework structure. The stackable modules are used as building blocks to build vertical farming columns within the framework structure, e.g., having a supply of water at the top, a plurality of growth modules arranged stacked one on top of another, and a spacer module at the bottom to provide drainage and preferably capture water for re-use. The columns are analogous to the storage columns of the previously described automated storage and retrieval systems, e.g., as illustrated in FIG. 1. Preferred features referred to in relation to the automated storage and retrieval system, e.g., as described in relation to FIGS. 1 to 4, apply equally to the stackable modules, framework structure, module handling vehicles The stackable modules may comprise support members for supporting functional components, for example, a vertically arranged growth board for growing the plants or a vertically arranged plate member for supporting other functional components, like sources of light, heat or air movement. The support members may take the form of side support members. They may have vertical grooves into which may be slotted a vertical plate, for example, carrying growth medium or one or more functional components.

The stackable modules may have application also outside of a vertical farming system. Through being able to carry functional components incorporated into a vertical plate or held via another arrangement, the stackable modules may be used in an automated storage and retrieval type system for a purpose other than vertical farming. The use of stackable modules more widely, in an automated storage and retrieval type system having a grid-based framework structure in order to provide functions locally within a storage column, is within the scope of this disclosure. Accordingly, while the invention is illustrated in the context of vertical farming systems and vertical farming facilities since that is the primary focus for the stackable modules, references to these should be read as also including use of the stackable modules in other types of systems or facilities having a similar framework structure where the stackable module supporting a functional component may offer a benefit locally within a column, for example but not limited to, heating, lighting, air circulation, sensors, fire protection, acoustic protection, insulation and the like, whether that be a system in an automated storage and retrieval system or a system employing similar technology for a different purpose.

The support members of the stackable modules are part of a load bearing frame that allows the stackable modules to be arranged in a stack of other modules in a column of framework structure, e.g., of a vertical farming system. This may be a column of a vertical farming facility, where the columns correspond to the storage columns of an automated storage and retrieval system, as described above in relation to FIG. 1. By way of example, the stack may be over 10 stackable modules high, and preferably over 15 stackable modules high.

The support members may be in the form of a strut, for example a load bearing strut, forming a side of the frame of the stackable module. The support members may have an upper edge surface for supporting a module above, a lower edge surface for resting on a module below and a body between which transfers load from above to a remainder of the stack below.

The upper edge surface of such a support member may be provided with recesses, e.g., in the form of notches, to allow a gripping mechanism of a module handling vehicle to engage with the top of the stackable module in order to lift a stackable module from a stack of modules in a column, carry the stackable module around the vertical farming facility and to lower the stackable module into a column. The module handling vehicles may be analogous to the container handling vehicles of the automated storage and retrieval systems described above.

The support members, which may be regarded as side support members, may be I-shaped, for example, as seen when viewing the stackable module from a side. The top and bottom of the I-shape may provide arms and feet of the support member which include the upper and lower edge surfaces, respectively, that are for engagement with corresponding edge surfaces of modules above and below and for transferring load from module to module.

The same shape of support member may be used for a range of stackable modules, including but not limited to, growth modules, water tank modules and spacer modules.

The support members of the stackable module may be held in a spaced relationship by a cross-member. This cross-member may be a growth board or some other form of vertical plate providing a function within a column of the vertical farming facility. The cross-member may also be a water tank or a frame supporting a water tank in the case of a water tank module. The cross-member may be a drainage or water collection device, e.g., in the case of a spacer module.

While embodiments described herein may have a 'vertical plate' which is arranged in a vertical manner within the carrier frame, the vertical plate need not be arranged truly vertical to perform the majority of the functions described herein. Stackable modules with plates arranged substantially vertically within the frame of the module may also be envisaged as being within the term "vertical plate". Substantially vertical may be seen as up to 10° either side of true vertical.

In the case of a growth module, the vertical plate may be referred to as a "growth board". It may function as a substrate for supporting a porous growth medium, such as a fibre board (e.g., similar to an insulation board) or other appropriate hydroponic growth media or it may be a board that comprises a porous growth medium, such as a region or layer of fibre board formed into the growth board for guiding fluids like water and/or nutrients to plants held by the growth board. Seeds may be germinated in the growth medium, and plants may grow horizontally out from the vertically arranged growth boards.

An assembled, stackable module may have essentially the same footprint as a storage container of a regular automated storage and retrieval system in which the vertical farm may be implemented, such that the assembled stackable modules can be arranged in stacks in columns of the framework structure of the vertical farming system, in the same way as the storage containers in a framework structure of a regular automated storage and retrieval system might be arranged, for example, in a regular AutoStore type of automated storage and retrieval system as has been described above in relation to FIG. 1.

As side support members, the support members may have upper and lower load-transferring edges, such that the stackable modules can be stacked upon each other and bear the weight of the stack of modules, which might be more than 10 stackable modules high, and in many cases more than 15 stackable modules high.

The portions of the support members providing the upper and/or lower load-transferring edges may extend the full length or width of a grid opening in a grid rail system of a framework structure of a vertical farming or other facility, so that those portions of the support members are guided by sides of the rails and by portions of the upright members of the framework structure as the stackable modules are raised and lowered into the columns. The portions of the support members may be arms and legs of the support member, the arms and legs extending horizontally from a body in the form of a load-bearing strut. The support members may be I-shaped.

The spaced apart first and second support members of the load-bearing frame of the stackable module are configured to enable the stackable module to occupy a cuboidal volume within which the functional component of the stackable module can be supported. The stackable module in this way occupies a cuboidal volume of a column of a framework structure of a vertical farming facility in a similar way to a storage container occupies a cuboidal volume of a framework structure of an automated storage and retrieval system like that shown in FIG. 1.

The upper load-transferring edge surface of each support member may comprise recesses arranged to be engaged by a gripping mechanism of a module handling vehicle of the vertical farming system, so that the stackable modules can be lifted, lowered and transported by the module handling vehicles of the system. The module handling vehicles may be the same as or similar to the container handling vehicles of the known automated storage and retrieval systems and they may handle the stackable modules in the same way as the storage containers.

The recesses may be in the form of rectangular slots provided in an upper edge or lip of each side support member. The gripping mechanism may comprise grippers which reach through the rectangular slots and are displaced to grip on to the edges of the slots. More preferably the recesses may be provided in corner regions of an upper edge of the support member for allowing part of a gripper mechanism to extend through the recess and grip the other side of that edge.

Since the stackable modules may be modular in construction, the stackable modules may be simple to manufacture and transport. In this way, they can be transported disassembled as so-called "flat packaging", and then assembled at the vertical farming facility. The stackable modules may also be disassembled at the vertical farming facility and re-assembled as needed, for example, to assist with storage when not in use.

The side support members may have more than one vertical groove provided on an inwardly directed surface, such that the growth boards in the case of growth modules (or other plates) can be arranged in different positions with respect to the support members, for example, to accommodate different lengths of growing plants.

The vertical groove (or grooves) may be provided in part or full by a vertical slot in the side support member, for example, a slot moulded into a surface of an inner wall of the side support member, or it may be provided by a plurality of lugs projecting from a surface of the inner wall that act to define a groove to guide an edge of the growth board as it is slid into position between the side support members. The groove and engagement of the growth board may be of assistance for assembling the growth module and/or may provide additional stiffness to the structure.

In some embodiments of the stackable modules, the support members may be held in a spaced apart and parallel configuration by a plurality of rods or other form of spacers. The support members may be arranged to extend horizontally across a top and a bottom of the stackable module. The support members may include a slot or other supporting formation for supporting a plate or other functional component within the cuboid volume defined by the stackable module, preferably in a vertical orientation. Such stackable modules may be of modular construction, allowing for on-site assembly and disassembly, and may allow different plates, for example, providing different functions, to be loaded into the frame of the stackable module, e.g., by sliding a new plate into a slot to replace a previous plate. Such plates might comprise growth medium, allowing the stackable module to be reloaded or harvested, or they may comprise some other functional component, like a heater, a light source, a fan, insulation, fire protection, etc., allowing the stackable module to provide an alternative function.

In the stackable growth modules, a growth board may be supported between a pair of support members, preferably side support members that are in the form of I-shaped struts. The growth board may comprise a tab at each side edge surface which is received in a vertical slot in an inner face of the support member. The side support member may be a moulded component and may be useable on either a left or a right side of the stackable module to reduce manufacturing costs. Fasteners may be used to secure the growth board in place between the support members.

Using such stackable growth modules, since the plants grow horizontally out from the vertically slotted growth board, and since the growth modules do not need to comprise the solid walls of a box-shaped storage container, light and airflow can be provided to the plants from a side of a stack of stackable modules in a column of the vertical farming facility rather than needing a light source arranged above each individual container of the type having a horizontal growth tray. This has benefits in terms of accommodating and powering such services.

While the stackable modules, particularly those in the form of modular stackable modules, will be described in detail in the context of a vertical farming system, it should be understood that the stackable modules, e.g., ones in the form of modular stackable modules, can be used in an automated storage and retrieval system for a purpose other than vertical farming. The vertical plate that is slotted into the grooves of the side support members could have different functions than that of a growth board. The vertical plate could, for example, be equipped with LED lamps or other type of light source, the plate could support sensors or indeed any other type of equipment, for example, fans, heaters, coolers, fire suppressant equipment or any other type of functionality where a box shaped storage container may not be required or be desirable. The vertical plates could, for example, be made of a fire-retardant material to form a firewall internally in the framework structure, or the plates could comprise insulation material to form different temperature zones within the framework, reflective material to direct light, absorbent material to draw up moisture, etc.

In a second aspect, the invention concerns an integrated, non-drip watering arrangement for watering plants being grown in a vertical farming system. The watering system may comprise growth boards, like those described above, with non-drip functionality and optionally a portable water supply unit in the form of a water tank module.

According to this aspect, receptacles holding vertically aligned growth boards may be arranged in stacks. In one embodiment, the receptacles may be arranged in a stack within a storage column of a framework structure of an automated storage and retrieval system (e.g., an automated storage and retrieval system as described above), such that the growth boards of the stack may be all in vertical alignment with each other. In another embodiment, the receptacles may be arranged in stacks that are not within a storage column of an automated storage and retrieval system, for example in a self-supporting stack in an open floor plan arrangement.

A preferred watering system for this aspect will be described below, with the illustrated receptacles being the modular stackable module as described above. However, it should be understood that other types of receptacles for holding the growth boards in vertical alignment could also be employed. For example, a box-shaped, rigid container having the material from the four walls and the floor mostly removed (with four corner posts remaining) could hold the growth boards.

As described above, the growth boards support or comprise a growth medium. According to one aspect, the growth medium is a porous material such as a fibre board (e.g., insulation material) or other appropriate hydroponic media. The porous growth medium comprises a property that permits the material to be quickly saturated with water, such that water passes through the growth medium and seeps from the bottom of an upper growth board and into the top of a lower growth board which is next in line, and so on, down the entire length of the stack, finally dripping or otherwise draining from the bottom of the lowermost growth board.

In a preferred arrangement, arranged at the upper edge of the growth board is a longitudinal watering trough, which may be provided with a series of holes. Water introduced into the watering trough can thereby be distributed along the upper edge of the growth media though the holes in the watering trough. Arranged at the bottom edge of the growth board is a longitudinal collection trough. Water seeping from the bottom of the growth media may then be collected in the collection trough. The collection trough may comprise one or more openings allowing water collected in the collection trough of to drip into the watering trough of a growth board arranged below. In a preferred arrangement, the collection trough comprises a single opening in the form of a drain for the collection trough, which may be centrally arranged along the collection trough, to provide a simple drainage solution. Other arrangements are also envisaged, for example, two or more spaced openings.

According to one aspect, the watering trough and collection trough are integrated parts of the growth board, for example, parts of a frame member surrounding the periphery of a vertical substrate surface of the growth board.

According to another aspect of the watering system, the opening or openings of the collection troughs have a valve that in an open position allows water to flow downwards and out of the collection trough, but in a closed position prevents water from flowing from the collection trough. In this manner, the valve can be activated to be in the open position when the growth boards are arranged in a stack, but can be switched back into a closed position when the growth frame holding the growth board is lifted and transported by a module handling vehicle of the vertical farming system. This prevents water from dripping into the tracks of the rail system as the growth frame is being transported above the rail system. The valve may be activated through the act of stacking the growth board on top of another growth board, or on to a structure having a device to open the valve.

The valves in the collection trough may be activated in a number of ways, including electrically activated or mechanically activated, similar to valves known in the art.

In a preferred embodiment, the valve comprises a sealing member, such as a ball (for example, a metallic ball (e.g., steel ball, like a stainless steel ball bearing), a ceramic ball (e.g., a ball made of stone or glass), a dense plastic ball (e.g., having a density greater than water), a flap or other appropriate sealing structure, that seats into or otherwise seals an opening in the bottom of the collection trough.

According to this embodiment, each of the watering troughs of the growth boards may be equipped with an upwardly projecting pin that aligns with the opening of the collection trough above it when the frames are stacked in a storage column. In this manner, when the stackable modules are stacked, the pin of a lower growth board may push up the ball (or other device) of the valve of the collection trough immediately above it in the stack, allowing water to flow from the collection trough to the watering trough of the growth board below. In addition, when a stackable module is lifted by a module handling vehicle, the ball is able to fall into place in its corresponding hole, thus preventing water from dripping out of the collection trough during transport of the frame along the rail system of the framework structure.

At the lowermost position of a stack, a water collection/drainage means may be provided that collects water flowing out of the collection trough of the lowermost growth board of the stack. This can be in the form of a drainage pipe connected to a drainage nozzle having a pin that activates the valve of the lowermost growth board of the stack.

The non-drip water system may also comprise a portable water tank, which in a preferred embodiment may be mounted between the side support members of a modular frame. The portable water tank may be provided as a water tank module that can be used is a framework structure of an automated system like a vertical farming facility. The water tank may be filled with water at a filling station, carried by a module handling vehicle (or other lifting device, such as a gantry arrangement) and placed at an uppermost position in a column of the framework structure of the vertical farming or other system on a stack of stackable modules.

According to one embodiment, such a water tank module may have a valve similar to the valve discussed above for the collection troughs, and in a preferred embodiment comprises a ball or other sealing member that is activated by a pin of the uppermost growth board of the stack. The portable water tank provided by the water tank module avoids the need for water pipes and other watering infrastructure to be retrofitted or installed in the framework structure of the vertical farming system, and in addition allows customized nutrient blends to be provided for each stack in the vertical farm. A nutrient blend can be added to the water tank at the time of filling that is customized for the particular needs of the type of plants growing in a particular stack. The water tank module can be configured to release water (and any nutrients) at a predetermined rate into the uppermost growth module of a given stack of modules.

In another aspect the invention provides a complete vertical farming system comprising the modular stackable module/growth board and non-drip watering arrangements described above, employed in the infrastructure of an automated storage and retrieval system as described in the background section above, including the framework structure, automated handing vehicles, control system and other aspects of the prior art storage and retrieval system described above.

The vertical farming system according to this aspect comprises stackable modules holding growth boards arranged in the storage columns of the framework structure. When utilized as a vertical farming system it may be convenient to refer to the modular stackable modules that carry growth boards as "growth frames". According to one aspect, growth frames may be arranged in adjacent columns of a vertical farming system, such that stacks of growth frames are arranged in adjacent rows of columns. It is also possible to arrange growth frames in alternating rows of columns, with an empty row of columns between rows containing plants. Lighting means for the plants and/or active or passive ventilation means may be arranged between rows of columns containing plants, whether in a space between adjacent rows of columns containing plants or in the empty row between alternating rows of columns containing plants. The choice of which arrangement to utilize could depend upon factors such as the needs of the species of plants. For example, some species may require greater air flow or require more frequent tending or visual inspection, in which case it may be advantageous to use alternating rows of columns for growing plants. In other situations, the requirements of the plants may permit a more dense arrangement of adjacent rows of columns containing growing plants. Employing intermediate empty rows of columns without plants may provide easier access for tending and otherwise visually monitoring the plants or provide greater airflow, however at the expense of less crop yield per unit area.

According to one aspect, a spacer module is arranged at the lowermost position of a storage column in which stackable modules are stacked. The spacer modules of a row of columns containing plants, thus create a passageway under the stackable modules for arranging water conduits, ventilation pipes, electrical wiring and other infrastructure. According to one embodiment, the spacer module comprises a drainage nozzle with a pin that actives the valve in the collection trough of the lowermost growth board. The spacer module may comprise a pair of side support members held in a spaced apart relationship by a cross-member of some form. As the spacer module is not subject to the same concerns of providing even light and ventilation as to the growth modules above, the spacer module may use a similar side support member as proposed above for the growth module to save on manufacturing costs but could include additional components to assist with supporting the load above and stabilizing the stack.

Growth Board with Drain

The invention also provides an alternative embodiment of the growth board comprising a drain in the form a liquid passage from the water trough along the top edge of the growth board to the collection trough at the lower edge of the growth board that bypasses the porous growth medium. The drain is arranged to convey a portion of the water collected in the water trough of a first, upper growth board in a stack directly to the water trough of a second, immediately lower growth board without said portion of water flowing though the porous growth medium. This portion of water is thus more immediately available for distribution along the top edge of the second growth board than is the portion of water that must first seep through the porous growth medium. If and when sufficient water is collected in the water trough of the second growth board, its drain can convey a portion of the water collected in its water trough directly to the water trough of a third, next lower growth board, and so on down the stack. This arrangement provides an alternative flow rate of the water, and in certain conditions may increase the rate of wetting of growth mediums further down the stack.

In one aspect, the drain comprises a drain opening that is elevated above the lowermost part of the water trough. When a sufficient amount of water is collected in the water trough such that the water level rises above the height of the drain opening, a portion of the water will flow into the drain opening and through the liquid passage to the collection trough of the growth board, and thereafter via the valve in the collection trough to the water trough of the next lower growth board.

In one embodiment, the drain comprises one or more cylindrical drain tubes that pass from the water trough downward along the vertical surface of the growth board to the collection trough. The upper end of the drain tube is elevated above the lowermost part of the water trough. In a preferred embodiment, the drain tube is vertically aligned with the valve device in the collection trough, and the upper, elevated part of the drain tube comprises the pin that presses up against the valve device in a an immediately higher growth board. In one aspect of this preferred embodiment, a deflector piece is arranged at the upper end of the drain tube, the deflector piece having a surface area greater than the diameter of the drain tube. In one aspect the deflector piece is conical, with the base of the cone having a diameter greater than the diameter of the drain tube. The upper end of the cone functions as the pin that pushes up the valve device. The deflector piece prevents water from flowing directly from the valve device into the drain tube when the valve is pressed upwards.

The embodiment of the growth board with drain is useful for, and may comprise a part of the stackable module aspect of the invention, the vertical farming watering system aspect of the invention, and the aspect of the invention related to a vertical farming system employing the infrastructure of an automated storage and retrieval system, all as described above.

Accordingly, the invention may be described as providing:

A stackable growth module comprising a vertically arranged growth board having a vertical surface for supporting plants, the growth board comprising:
- a porous growth medium supported by the vertical surface;
- a watering trough arranged along an upper edge of the growth board, the watering trough having water distribution holes for distributing water to the growth medium;
- a water collection trough arranged along a lower edge of the growth board to collect water draining from the growth medium, the water collection trough having a valve that is configured to open and permit water to flow out of the collection trough when the valve is an open position and which prevents water from flowing out of the collection trough when the valve is in a closed position, and
- a drain comprising a liquid passage from the watering trough to the water collection trough, said liquid passage bypassing the porous growth medium, the drain having an inlet within the watering trough, the inlet being elevated at a distance D1 above a lowest point in the watering trough;
- the stackable growth module comprising a load-bearing frame comprising a first support member and a second support member held in a spaced apart and parallel configuration by the growth board,
- whereby the load-bearing frame is configured to enable the stackable growth module to occupy a cuboidal volume within which the growth board is supported,
- and wherein the load-bearing frame comprises upper and lower load-transferring edge surfaces.

BRIEF DESCRIPTION OF THE DRAWINGS

Following drawings are appended to facilitate the understanding of the invention. The drawings show embodiments of the invention, which will now be described by way of example only, where:

FIGS. 9-16 are perspective views of alternate embodiments of a stackable module. FIGS. 9, 10, 13 and 14 show stackable modules with side support members and FIGS. 11, 12, 15 and 16 show stackable modules with top and bottom support members.

FIG. 34 is a side view showing one possible arrangement of the height of the drain tube above the lowermost part of the water trough of a growth board.

DETAILED DESCRIPTION OF THE INVENTION

Figure 1:
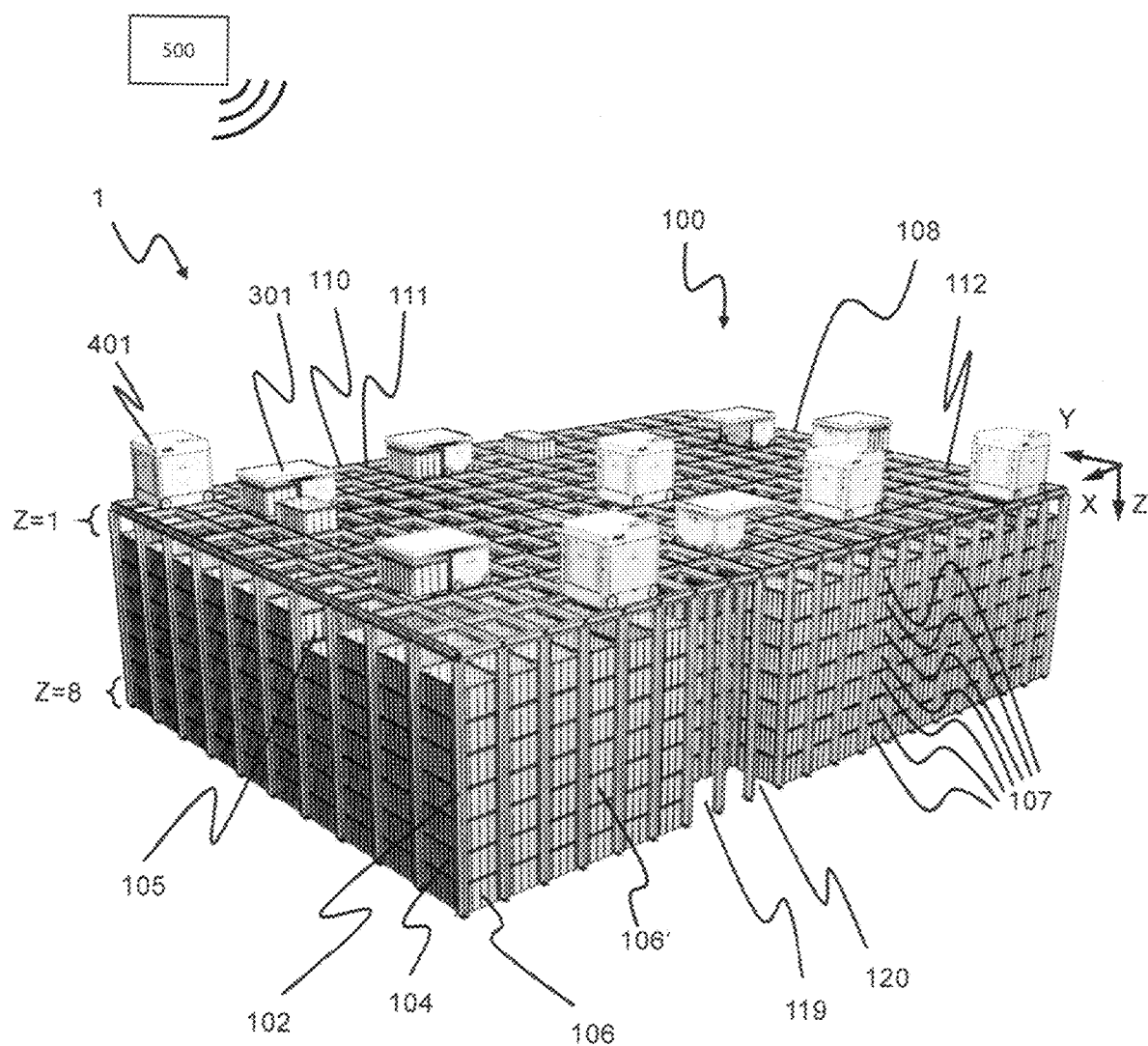
FIG. 1 is a perspective view of a framework structure of a prior art automated storage and retrieval system which would be suitable for use with embodiments of the proposed vertical farming system.
Figure 2:
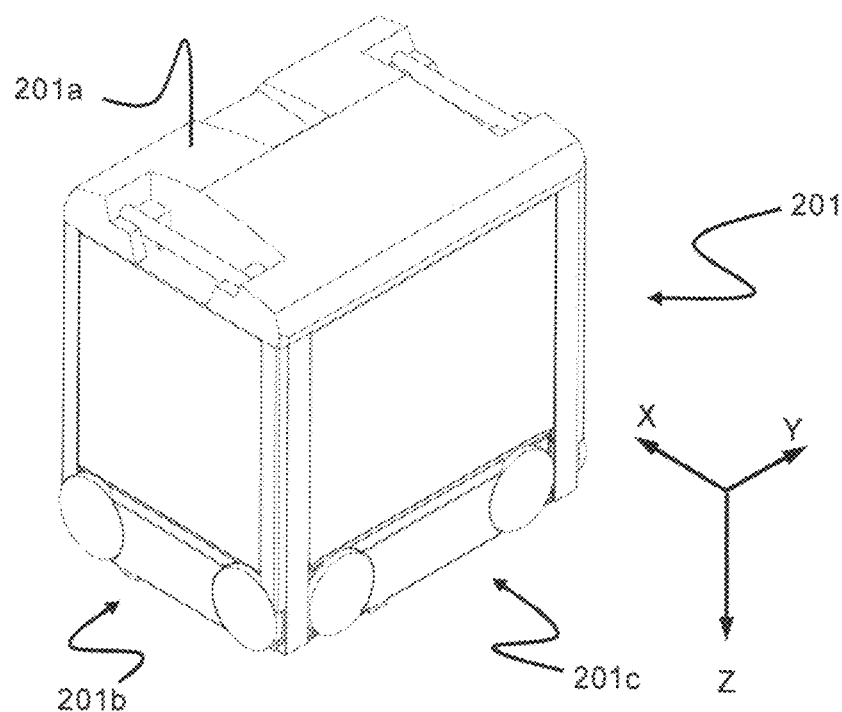
FIG. 2 is a perspective view of a prior art container handling vehicle having an internally arranged cavity for carrying storage containers therein and which could be suitable for carrying stackable modules.
Figure 3:
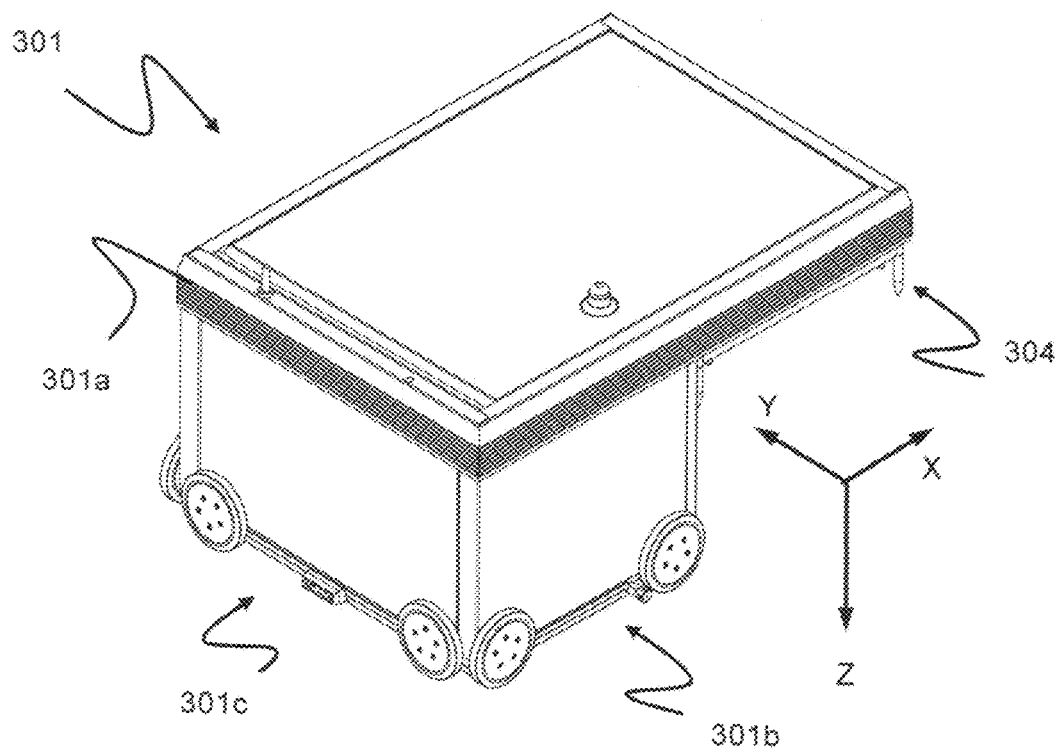
FIG. 3 is a perspective view of a prior art container handling vehicle having a cantilever for carrying storage containers underneath and which could be suitable for carrying stackable modules.
Figure 4:
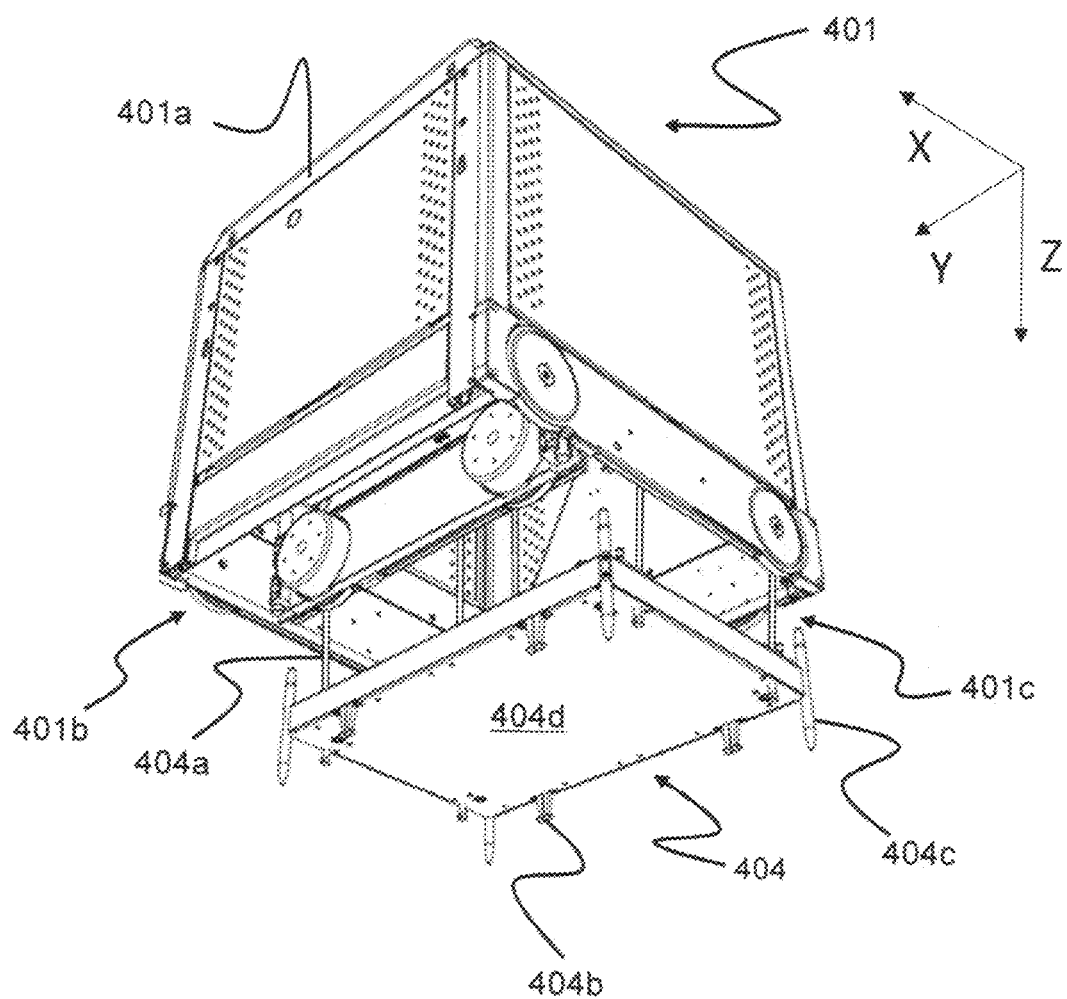
FIG. 4 is a perspective view, seen from below, of a prior art container handling vehicle having an internally arranged cavity for carrying storage containers therein and which could be suitable for carrying stackable modules.

In the following, embodiments of the invention will be discussed in more detail with reference to the appended drawings. It should be understood, however, that the drawings are not intended to limit the invention to the subject-matter depicted in the drawings.

According to one or more aspects of the invention, the invention comprises the infrastructure of an automated storage and retrieval system as described in the background section, and as illustrated in FIGS. 1-4, including a framework structure 100, rail system 108, storage columns 105, automated container handling vehicles 201,301,401 and control system 500. The framework structure 100 of the automated storage and retrieval system 1 is constructed in a similar manner to the prior art framework structure 100 described above in connection with FIGS. 1-4. That is, the framework structure 100 comprises a number of upright members 102, and comprises a first, upper rail system 108 extending in the X direction and Y direction.

The framework structure 100 further comprises storage compartments in the form of storage columns 105 provided between the members 102 wherein storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

The infrastructure of the automated storage and retrieval system is, according to an aspect of the invention, arranged as a vertical farming system. The term "vertical farming" in the context of the present invention refers to a system for growing plants in receptacles that can be stacked in the storage columns of framework 100, and which can be lifted, lowered and transported by container handling vehicles 201, 301, 401. The term "container handling vehicle" can therefore in the context of the vertical farming system of the present invention be understood to mean an automated vehicle arranged to lift, lower and transport on a rail system 108 the receptacles that hold the plants of the vertical farm. In the present invention the receptacles are in the form of stackable modules that can be stacked within the columns of the framework structure. The stackable modules (as will be described in more detail below) are configured to be stacked on top of other modules and occupy a cuboidal volume within a column, in a similar way to a storage container of the known automated storage and retrieval systems. The vertical farming system of the present invention is at least partially automated, with various tasks and controls being performed by the automated container handling vehicles, the control system 500, and other structures and systems as described in more detail below.

Stackable Module

As stated above, the plants of the vertical farming system of the present invention are grown in receptacles that can be arranged in self-supporting stacks, for example in storage columns 105. According to one aspect, the invention provides a novel receptacle in the form of a stackable module 10, illustrated in various embodiments in FIGS. 5-16. The stackable module 10 has a footprint essentially equal to the footprint of a storage container 106 of the automated storage and retrieval system, such that the stackable modules can be stacked in a storage column 105. The stackable module comprises means for supporting a vertically aligned cross-member 12 having a plate-shaped body 40 for supporting a growth medium 18, load-bearing means 14 for supporting the weight of a stack of a plurality of other stackable modules or containers 106 arranged above the stackable module in a storage column, these being in the form of side support members 22, and means for engaging the gripping mechanism of a module handling vehicle, which can be the same or similar to the gripping mechanism of a prior art container handling vehicle shown in FIG. 3 or FIG. 4.

Figure 17:
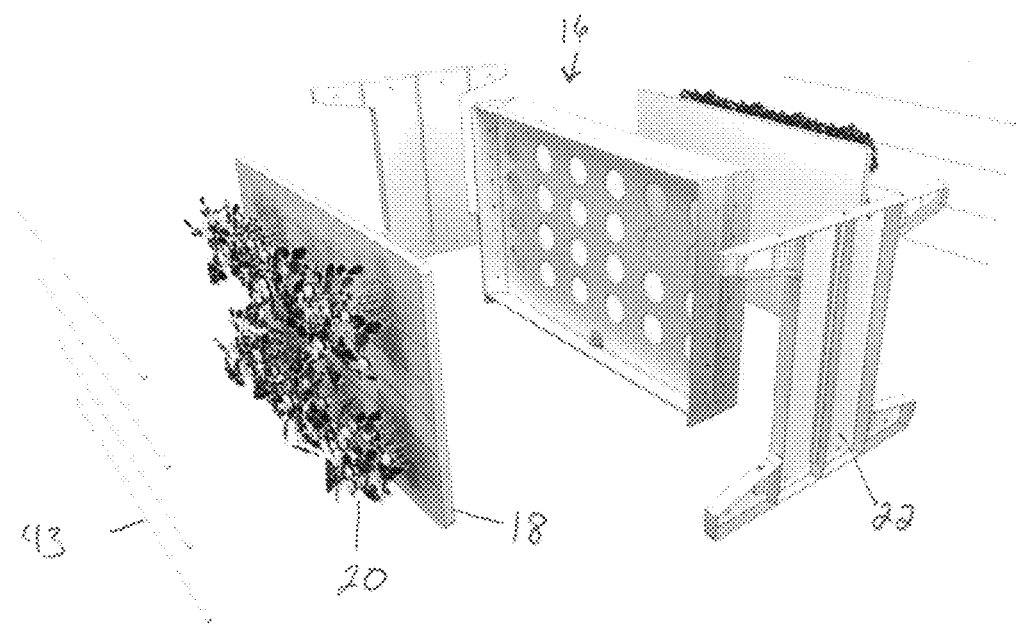
FIG. 17 is an exploded view of an embodiment of a modular stackable module arranged as a growth frame, with a growth board provided with growth media on opposed faces of a rectangular plate.

In the context of a vertical farming system as described below, the cross-member 12 is arranged as a growth board 16, which provides a vertical plate-like substrate for supporting a growth medium 18 in which plants 20 are grown (see FIG. 17). When used to support a growth board, the stackable module 10 may be referred to as a stackable growth module. Since the growth board 16 is vertically aligned in the growth module 10, plants 20 grow horizontally out from the growth medium 18.

Figure 5:
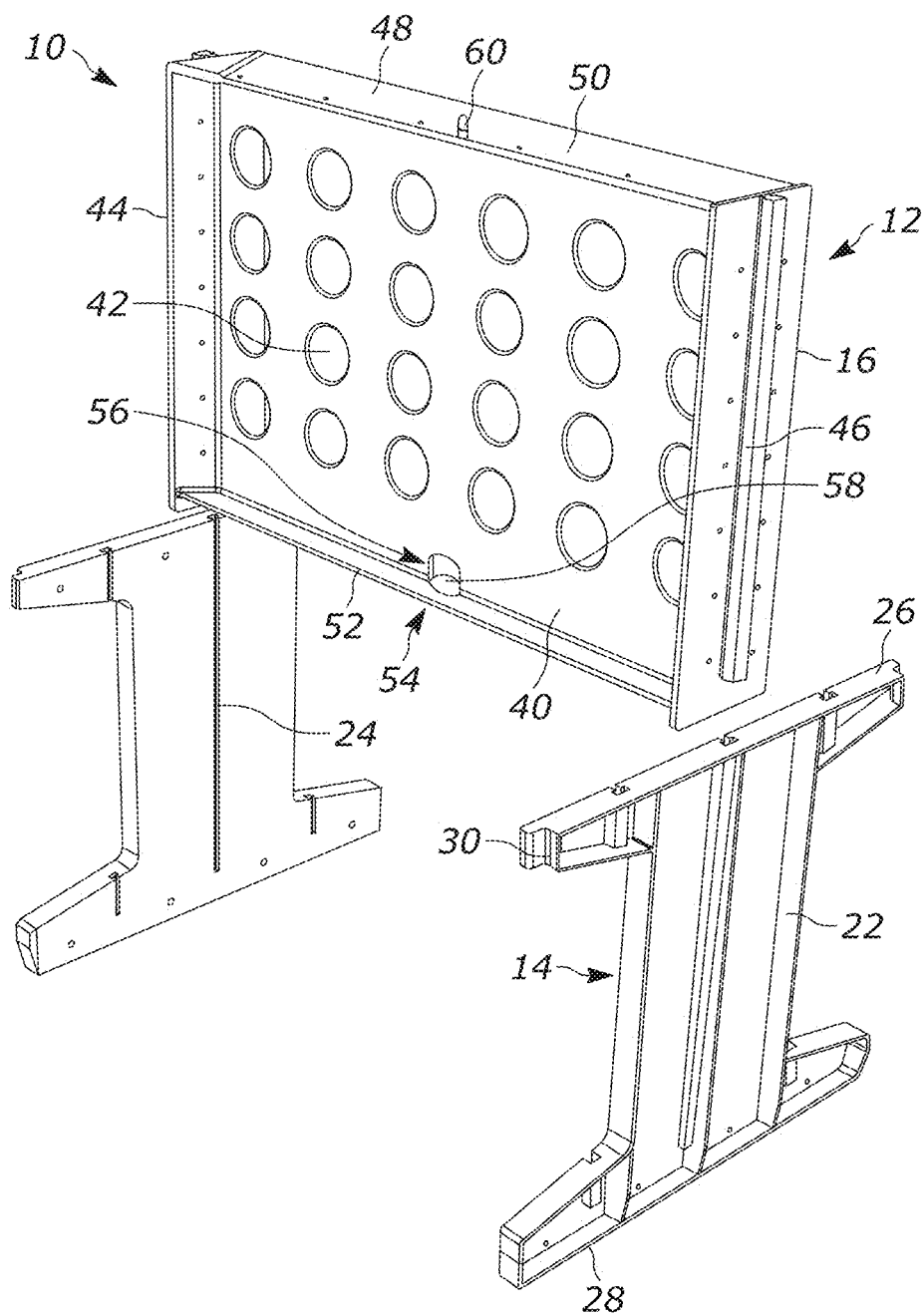
FIG. 5 is a perspective, exploded view of an embodiment of a modular stackable module showing a growth board being assembled between a pair of support members.
Figure 6:
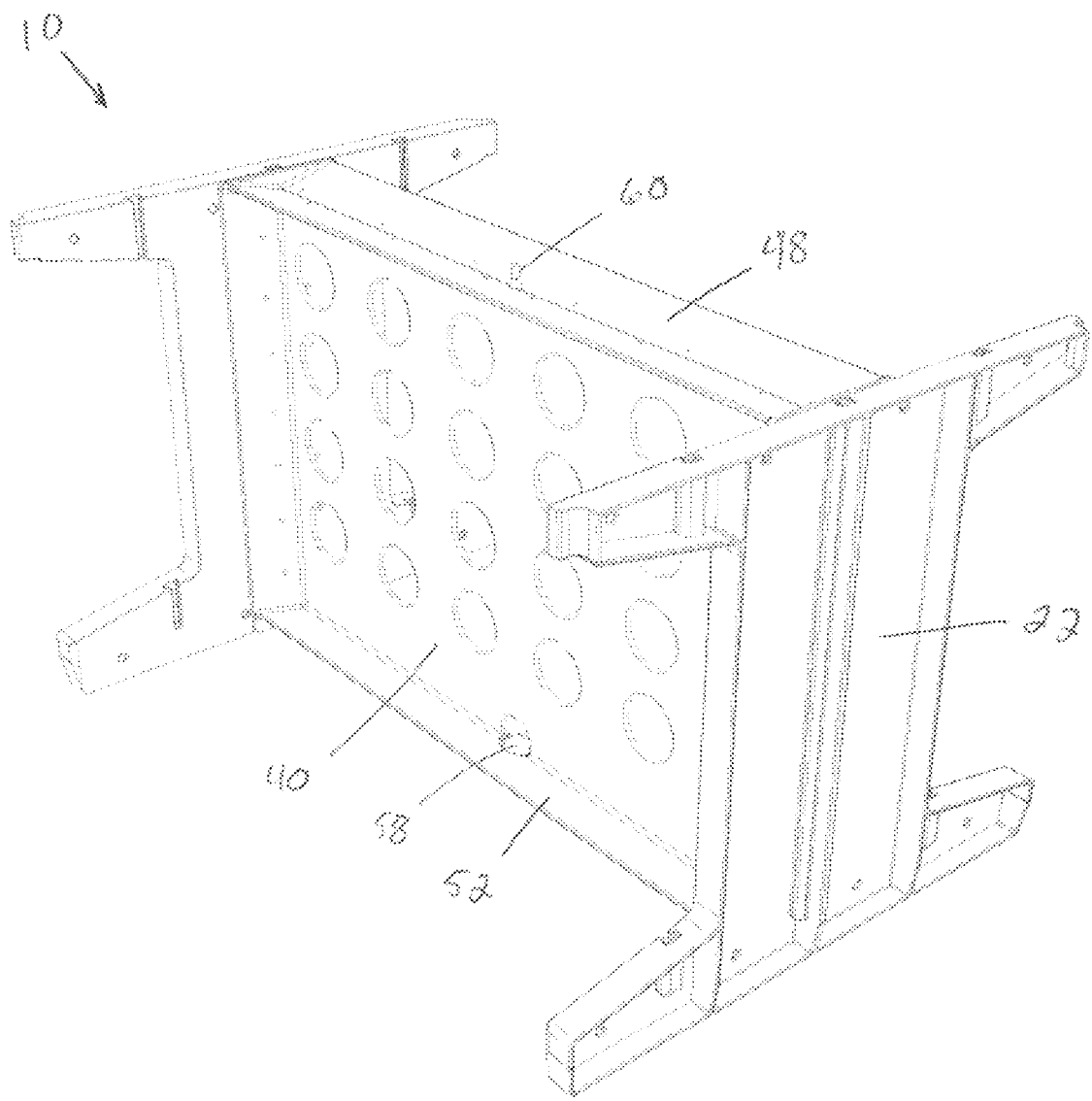
FIG. 6 is a perspective, assembled view of the stackable module of FIG. 5 with the growth board in place between the pair of support members.

While the stackable module 10 will be described in detail in the context of a vertical farming system, it should be understood that cross-member 12 can have numerous other functions. For example, cross-member 12 could be equipped with a power source to provide power to equipment in the interior of framework 100. Cross-members 12 could be equipped with LED lights, sensors, fans or other equipment. The cross-members 12 could be made of a fire-retardant material or thermal insulation, or used to support such materials, so as to form a fire wall, temperature partition, or acoustic insulation when arranged in stacks in rows of adjacent columns. The cross-member 12 may comprise the same plate-like form as shown in FIG. 5 with the rectangular body of the cross-member 12 supporting the components providing the other functions, in this way increasing the functionality of the part, or it may be a different shape or comprise materials that provide the other functions and loaded into place between a pair of support members 22.

FIGS. 5-8 illustrate a first embodiment of stackable module 10. According to this embodiment, the means for supporting the cross-member 12 comprises two side support members 22. In a preferred embodiment, the support members 22 are identical such that a side support member 22 can be used on either side of cross-member 12. In a preferred embodiment, side support members 22 are "I" shaped, such that the vertical segment of the "I" is arranged to cast a minimal shadow upon cross-member 12 if illuminated from a light source with an oblique angle with respect to the cross-member. This is of particular value when cross-member 12 is used as a growth board 16 for growing plants. The vertical segment of the "I" may have a width corresponding to half or less of the total width of the side support member 22 so that there is minimal shadow imposed on the plants.

Figure 7:
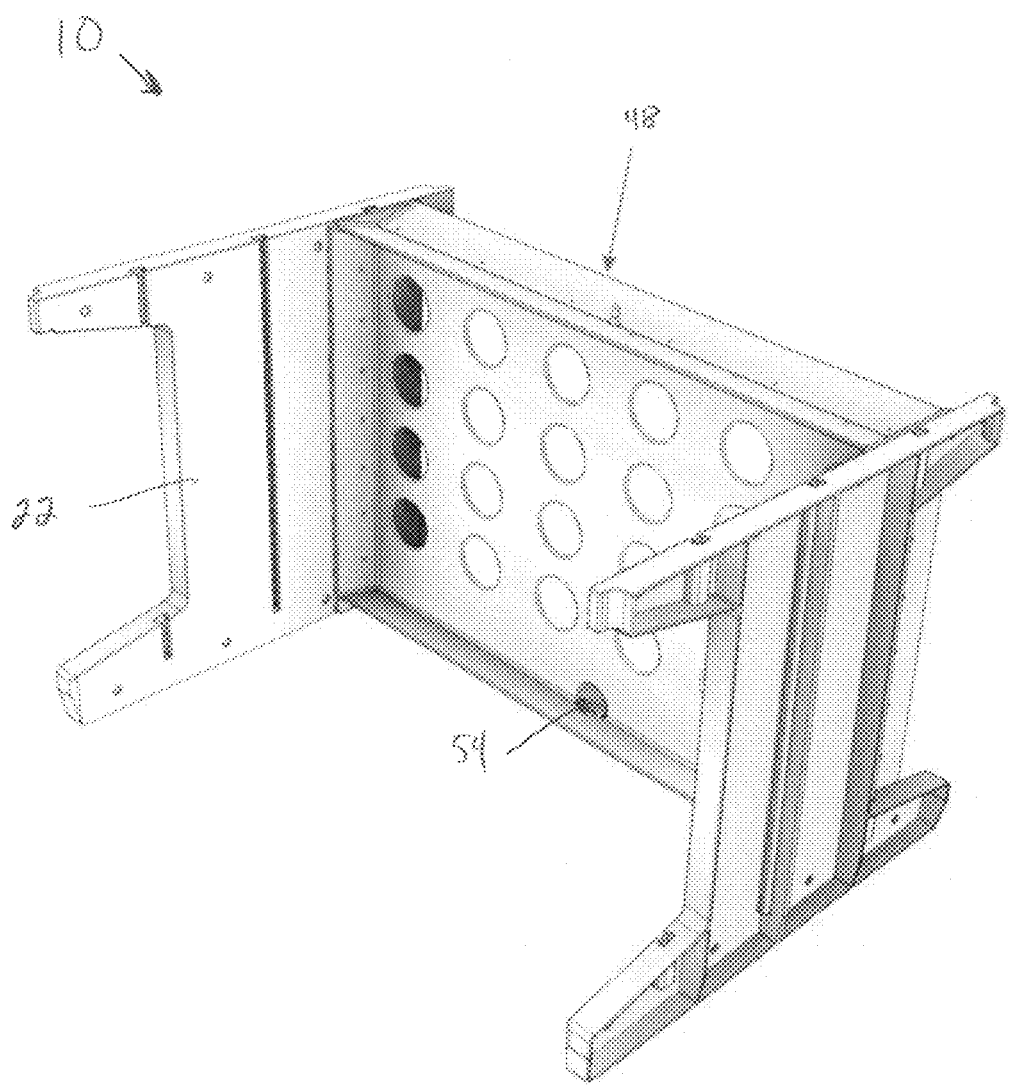
FIGS. 7 and 8 are perspective views of the stackable module of FIG. 5, with the growth board arranged in an alternate configuration in FIG. 7 and with a second growth board arranged in a further position between the support members in FIG. 8.

Further according to this embodiment, side support members 22 are equipped with one or more vertical grooves 24, arranged to receive a cooperating ridge or tab 46 arranged on cross-member 12. As shown in FIG. 7, the grooves 24 may be arranged to provide alternate lateral positions for cross-member 12.

Side support members 22 are preferably made of injection molded plastic. The side support members 22 may include vertically extending ribs to stiffen the side support members 22 and to help transfer loads. The side support members 22 may be moulded with grooves 24, recesses 30 for the gripping mechanism of a module handling vehicle, holes for fasteners and other such features as necessary.

According to the embodiment shown in FIGS. 5-8, side support members 22 are themselves the load bearing means 14, with the side support members 22 having upper and lower load transferring edge surfaces 26 and 28 respectively. These load transferring edge surfaces preferably have a length corresponding to a lateral dimension of storage containers 106 of an automated storage and retrieval system, such that the stackable module 10 has a corresponding footprint. Arranged along upper load transferring edge surfaces 26 are notches 30 arranged to engage with the gripping mechanism of a module handling vehicle.

FIGS. 9-16 illustrate alternate embodiments of stackable modules 10.

FIGS. 9 and 10 illustrate an embodiment having rectangular shaped side support members 32. As with the previously described embodiment, this embodiment has upper and lower load transferring edge surfaces and notches for engaging with the gripping mechanism of a module handling vehicle. The rectangular shaped side support members 32 are provided with an opening to minimize the impact of the side support members 32 on the provision of light and/or ventilation to the cross-member 12.

FIG. 10 shows plate member 12 mounted in grooves 24. According to this embodiment, spacer rods 34 separate and provider lateral stabilization for the side support members 32.

FIGS. 11 and 12 illustrate an embodiment having upper and lower rectangular support members 36 and 38 respectively. Rectangular support members have one or more grooves for supporting plate member 12, and have a footprint corresponding to a storage container 106. The upper and lower rectangular support members 36 and 38 comprise openings to minimize the shadow effect. According to this embodiment, load bearing means 14 are provided in the form of a plurality of support rods 39 arranged in the corners of rectangular support members 36, 38. The load bearing means 14 may be provided in the form of wider supports if shadowing is not a consideration. In these embodiments the support members 36, 38 are held in a spaced apart parallel relationship by the support rods 39, these collectively providing cross-members to maintain that relationship.

FIGS. 13 and 14 illustrate an embodiment having I shaped side support members 22 spaced apart by spacer rods 34. FIGS. 14 and 16 illustrate an embodiment where upper and lower support members 36, 38 have a shape other than rectangular, in the illustrated example having av "X" shape. In this embodiment, load bearing means 14 are support rods 39.

Non-Drip Watering System

Plants 20 grown in a vertical farming system need water in order to grow. Plants 20 may also require particular nutrients or a blend of nutrients in order to thrive and produce the best yield. According to one aspect, the present invention provides a watering system for plants grown on the growth media 18 supported by growth boards 16 that are carried by a receptacle, hereafter called a "growth module" a plurality of such growth modules being arranged in stacks in a vertical faming facility. The watering system will be described below in an embodiment where the watering system is implemented in the infrastructure of an automated storage and retrieval system with the growth modules being arranged in stacks in a storage column 105. It should be understood however that the watering system could be implement in other types of vertical farming systems. For example, the growth modules may be arranged in self-supporting stacks in a facility with an open floor plan with the growth modules being placed on top of one another by any appropriate type of module handling device such as a gantry crane. The growth modules could also be stacked manually.

Figure 20:
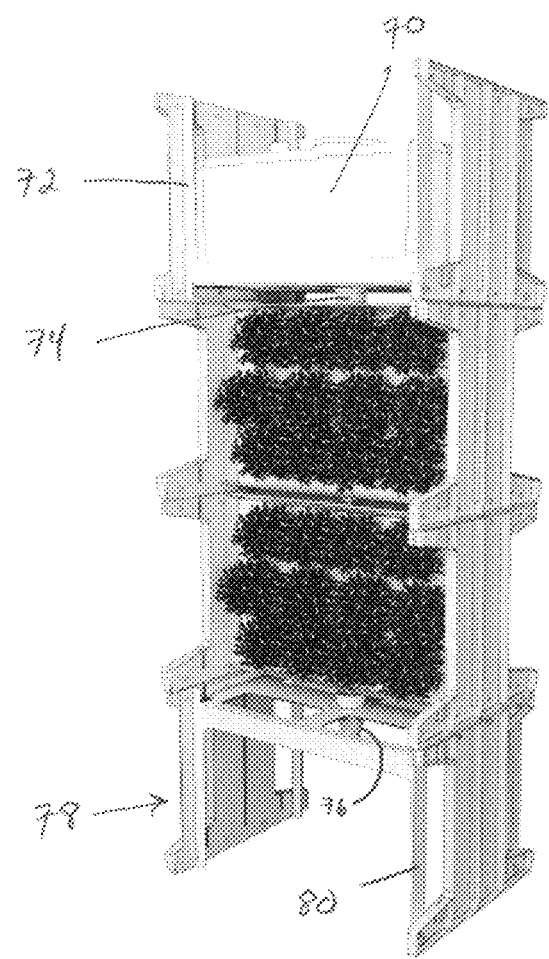
FIG. 20 is a perspective view of components of a non-drip water system in a stack, comprising a stack of growth modules providing growth frames for growing plants, a water tank module at an uppermost position in the stack providing a portable watering tank for watering the plants in the stack, and a spacer module at a lowermost position in the stack providing space below the growth modules for drainage and collection of the water.
Figure 21:
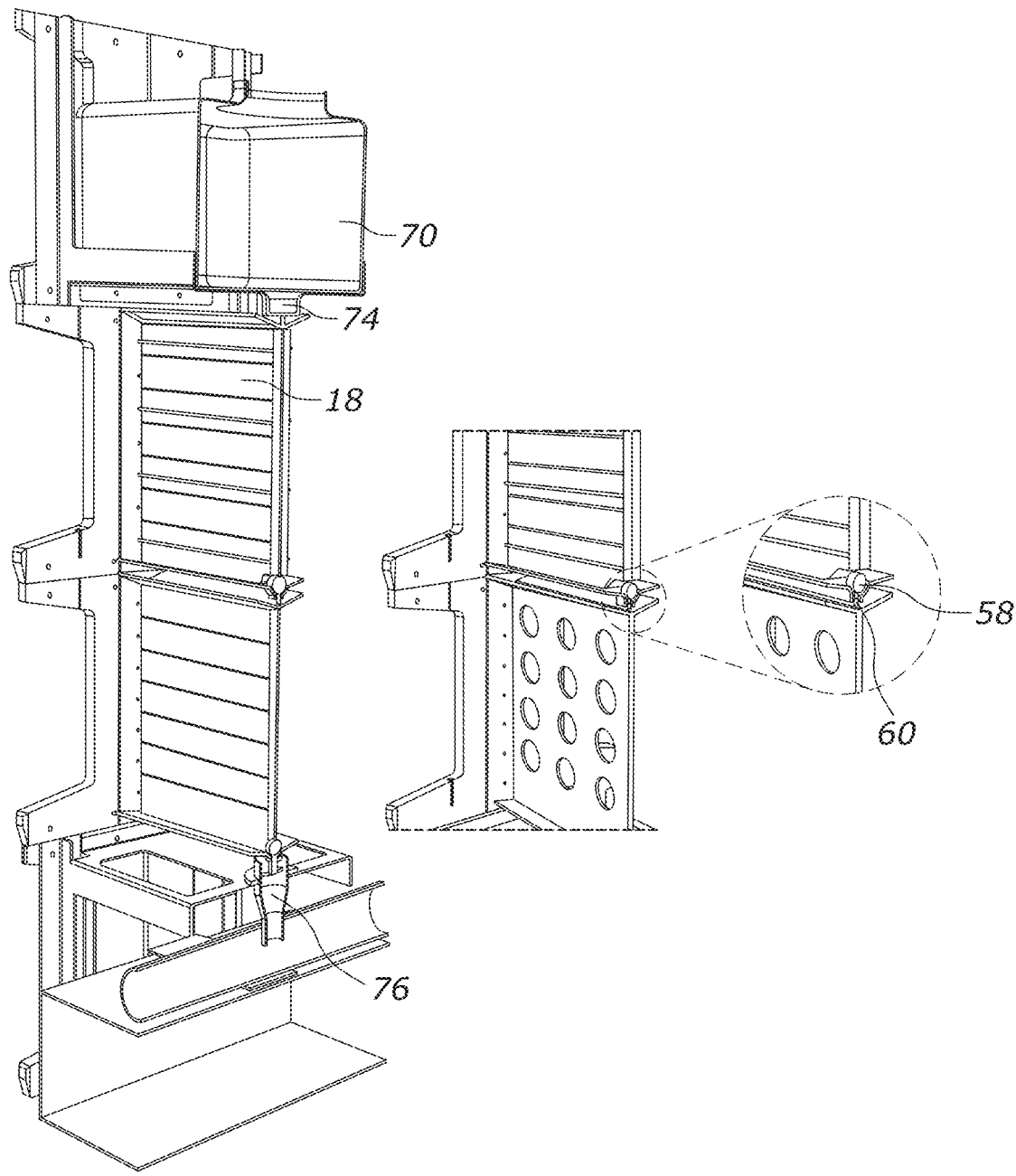
FIG. 21 is a perspective, cut away view of the components of the non-drip water system of FIG. 20 illustrating a collection trough, watering trough and valve of the non-drip watering system. Conduits for drainage and other services are also shown in the spacer module. Details of the valve and an actuator for the valve are shown in the enlargement.
Figure 22:
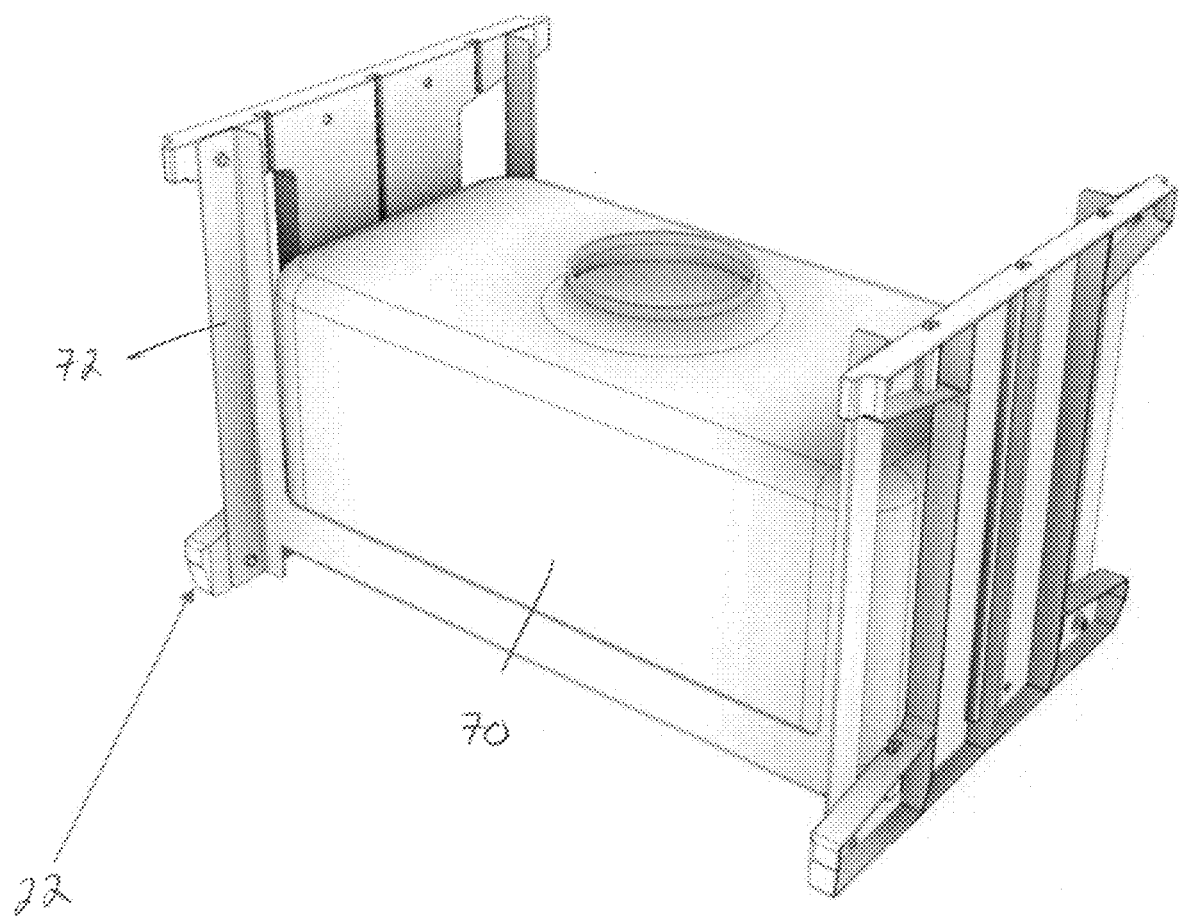
FIG. 22 is a perspective view of a water tank module providing a portable watering tank for use in the system.
Figure 24:
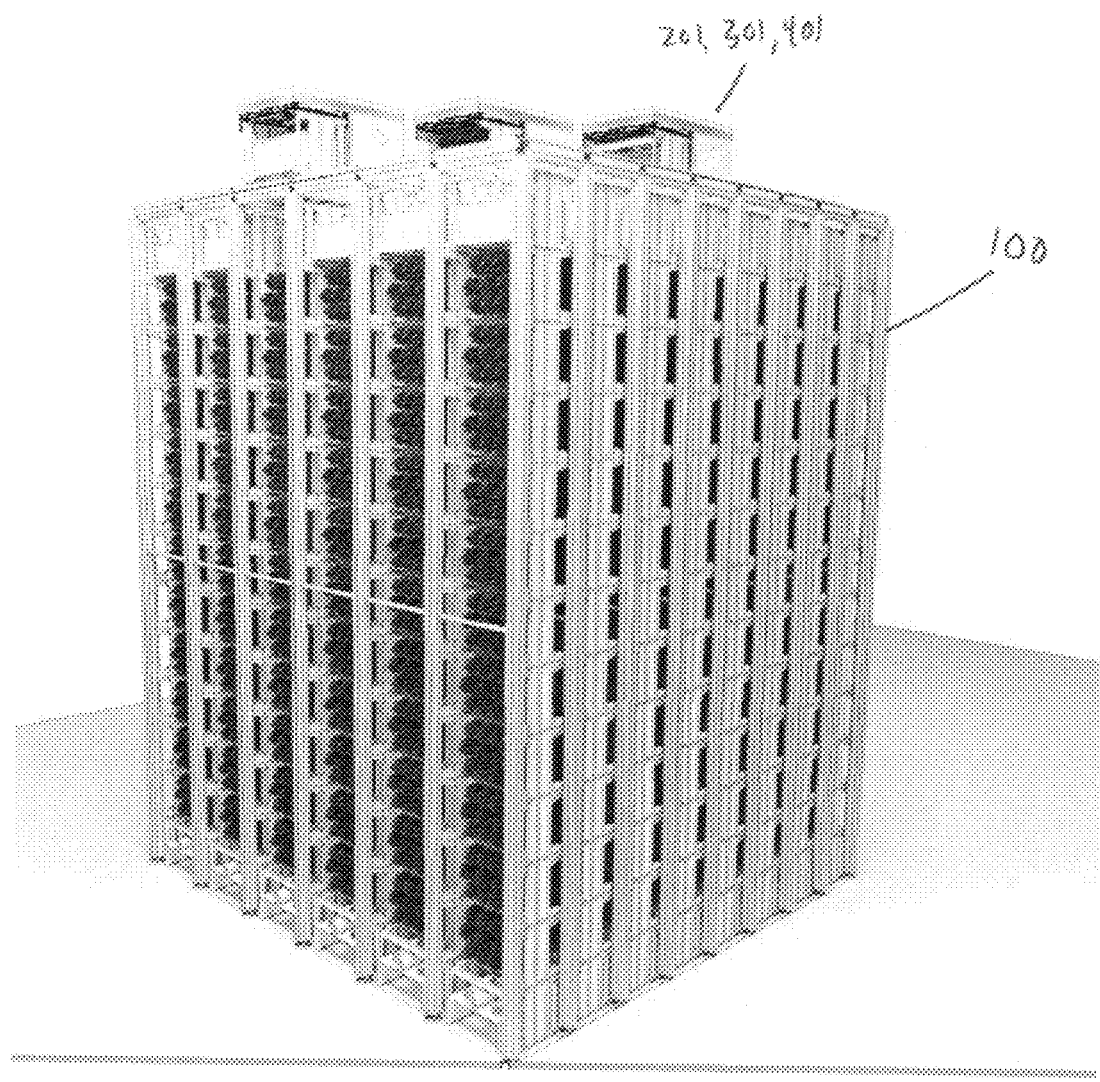
FIGS. 24-26 are perspective views of a vertical farming system utilizing the stackable modules (growth modules, water tank modules and spacer modules) in a framework structure of a vertical farming facility (mirroring the infrastructure of an automated storage and retrieval system seen in FIG. 1).
Figure 26:
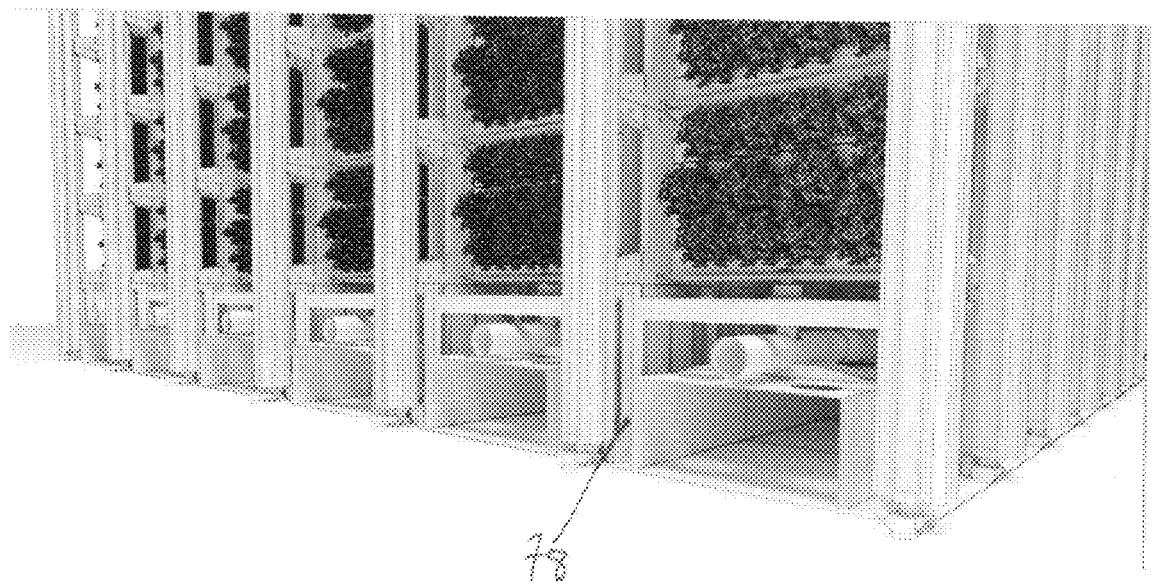

The growth boards 16 are mounted in the receptacle such that the growth medium 18 of each receptacle in a stack of receptacles is in vertical alignment, as shown in FIGS. 20, 24 and 26. When in vertical alignment, water is introduced into the growth medium of the uppermost receptacle. The growth mediums are preferably porous and with a property that permits the growth medium to become quickly saturated, such that, as more water is introduced beyond the saturation point, water drips or otherwise drains from the uppermost growth medium into the growth medium immediately underneath. As this next growth medium itself becomes saturated, it in turn drips or otherwise drains water to the growth medium underneath it. This process continues along the length of the stack, saturating all of the growth media with water, which exits the stack by dripping or otherwise draining from the lowermost growth medium of the stack of receptacles.

As can be appreciated, water dripping from the bottom of the growth medium will present a technical challenge when a receptacle holding growth medium is lifted out of the column and transported along the rail system 108 by module handling vehicles 201,301,401. Water will drip from the bottom of the growth medium and into the tracks of the rail system, which may interfere with the operation of the vehicles. Therefore, according to one aspect, the watering system of the present invention provides non-drip functionality.

According to one aspect of the watering system of the present invention, the receptacles in which growth boards 16 are mounted are stackable modules 10 according to the present invention as described above. This aspect of the invention will be described with reference to the embodiment of the stackable module shown in FIGS. 17 and 18, however the alternate embodiments of the stackable module 10 shown in FIGS. 9-16 are also within the scope of this aspect of the invention. While the invention will be described in relation to stackable module 10, it should be understood that the non-drip functionality of the water system will function with other types of receptacles that support growth boards in vertical alignment, such as for example a storage container 106, so long as the vertically aligned growth media 18 of a stack are in fluid communication with each other.

The watering system of the present invention comprises a growth board 16, as shown by the embodiments in FIGS.

Figure 8:
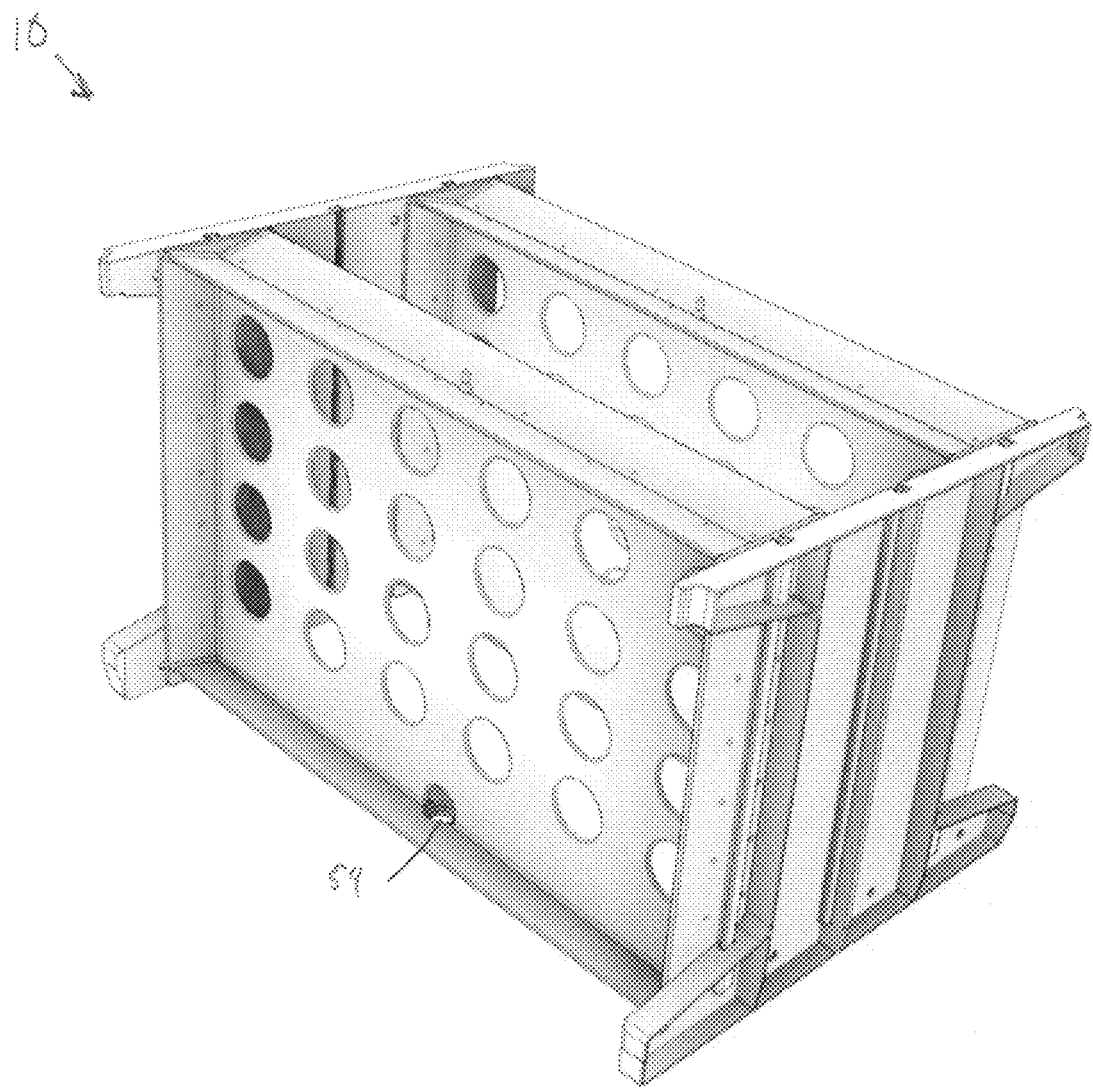

5-8, 17 and 19. Growth board 16 comprises a vertical surface 40. Vertical surface 40 may be perforated by a plurality of perforations 42. Around the periphery of vertical surface 40 is a wall of a frame member 44. Frame member 44 has a ridge or protrusion 46 that slots into a groove arranged in side support members 22 of stackable module 10. More than one groove may be provided in side support members 22, allowing various configurations of growth board 16, as shown in FIGS. 7 and 8, and allowing water to drain from one to the next so long as each of the growth boards of a stack of stackable modules are in vertical alignment in a stack. Attachment means 41 are provided for affixing growth medium 18 against the vertical surface 40. According to one embodiment, attachment means 41 comprise retaining rods 43 that are arranged to be inserted into holes along the side edges of frame member 44 as shown in FIGS. 17 and 18 such that the retaining rods pass in front of the growth medium 18, holding the growth medium firmly against vertical surface 40.

A watering trough 48 is arranged along a top edge of the growth board 16. According to one aspect, the watering trough 48 is integrated into an upper edge of frame member 44. Watering trough 48 comprises one or more water distribution holes 50 along the length of water trough 48. Holes 50 are positioned such that water that is introduced into watering trough 48 will flow through holes 50 and into a top edge of growth medium 18.

Figure 18:
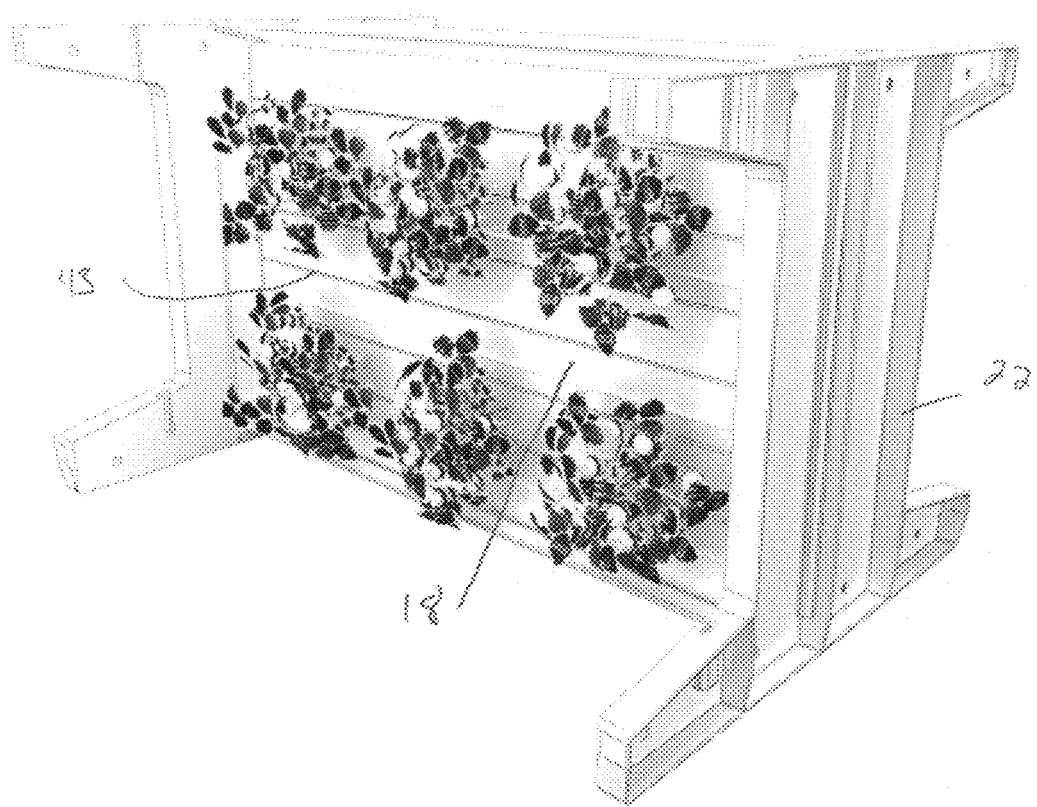
FIG. 18 is a perspective view of an assembled growth frame from FIG. 17, showing the stackable growth module with plants growing horizontally out from a vertically arranged growth medium.
Figure 19:
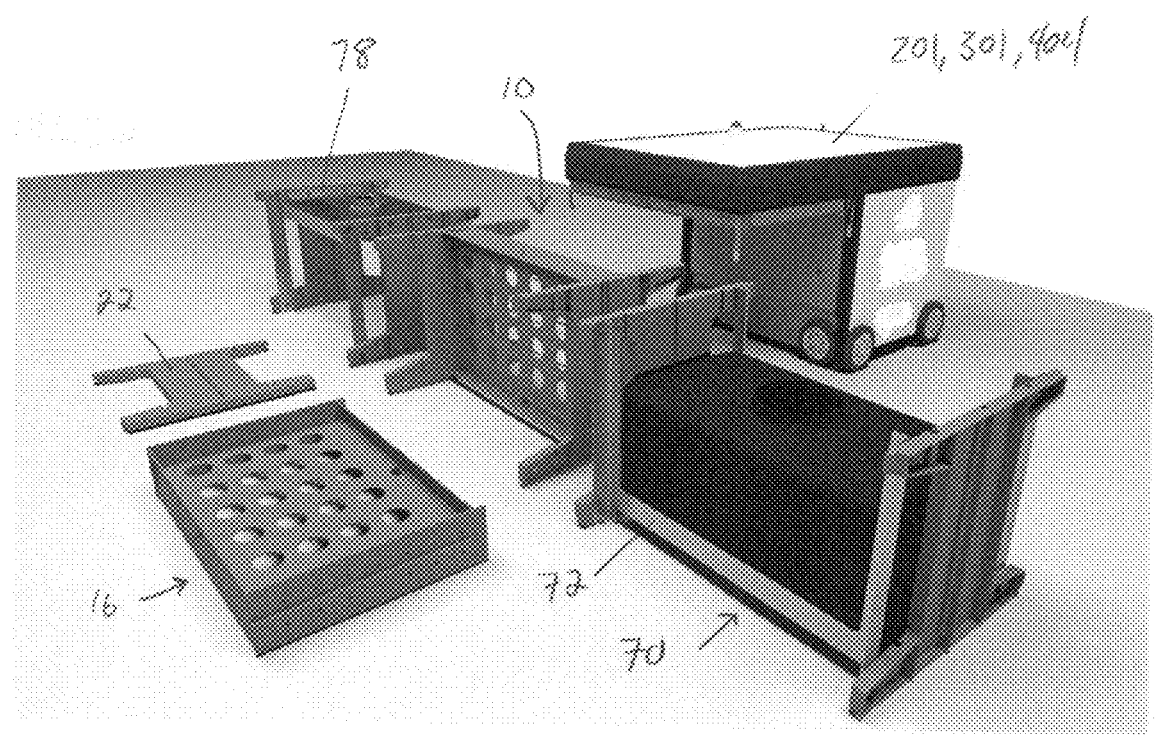
FIG. 19 is a perspective view of a preferred set of components for a non-drip watering system according to an aspect of the invention.

A water collection trough 52 is arranged along a lower edge of the growth board 16, below a bottom edge of the growth medium 18 when the growth medium 18 is affixed to the vertical surface 40, as shown in FIG. 18. The water collection trough 52 collects water that drips from the saturated growth medium 18. According to one embodiment, the water collection trough 52 is an integrated lower part of the frame member 44. The water collection trough 52 further comprises a water passage 54 equipped with a valve 56. When valve 56 is in an open position, water is permitted to flow downward out of the collection trough 52. When arranged in a stack of stackable modules, water flowing out of the water passage 54 will thus flow into the watering trough 48 of the next lower growth board in the stack.

The valve 56 may be a valve of various types known to one skilled in the art, and may function based on various actuating means known in the art. According to a preferred embodiment, the valve 56 comprises a movable body that sealingly rests in the water passage 54. According to one aspect, the movable body is a ball 58, such as a steel ball or ball bearing. The moveable body could also comprise a flap or other suitable sealing body. When the ball 58 is resting in the passage 54, the valve 56 is in a closed position, and when the ball 58 is pressed upwards, the valve 56 is in an open position. According to a preferred embodiment, the ball 58 is pressed upward by a pin 60 arranged in the watering trough 48 of the stackable module below. The length and position of the pin 60 is chosen such that when a first growth board 16 is positioned on top of a second growth board 16 in a stack, the pin 60 in the watering trough of the second growth board will press upward on the ball 58 in the collection trough of the first growth board. Water can thereby flow through all of the growth media in a stack. When a stackable module 10 is lifted out of a stack by a module handling vehicle, the ball 58 will fall back into place in the water passage 54, thus closing the valve 56. The growth module 10 holding a saturated growth medium can then be transported along the rail system without water dripping into the tracks of the rail system.

The watering system of the invention according to one aspect also comprises a portable water tank 70 as shown in FIGS. 19, 20, 22 and 24 in the form of a water tank module that can be moved around using a module handling vehicle or other lifting device. The water tank module 70 is arranged to be transportable by a module handling vehicle in the same way as the container handling vehicles of an automated storage and retrieval system can transport a storage container. According to one aspect, the water tank module 70 is mounted between side support members 22, thus taking advantage of manufacturing logistics in that the same side support members 22 for the stackable modules 10 can be employed with the water tank modules 70. In one embodiment the water tank of water tank module 70 is mounted to side support members 22 by a water tank bracket 72. The water tank module 70 is equipped with a water tank valve 74, which in a preferred embodiment is activated into the open position by pin 60 of the uppermost growth board of a growth module 10 of a stack onto which the water tank module 70 is placed. Water tank valve 74 may operate on the same principle as the valve 56.

The water tank of the water tank module 70 is filled with water at a filling station or other appropriate location, and transported by a module handling vehicle to, and placed on top of, a stack of growth modules 10 in a column, whereupon the water tank valve 74 is activated to the open position such that water starts to flows down along the growth media of the stack. According to one aspect, a nutrient blend may be added to the water tank at the time of filling. The water tank module 70 may comprise means to monitor a water level in the water tank. Such means may be visual means such as the water tank being made of a transparent material, or the water tank may be equipped with a water level sensor in communication with the control system 500 of the automated storage and retrieval system, such that the water tank modules may be automatically refilled by the system when needed. In such case a filled water tank module 70 may be transported to the stack at or near the same time that an empty water tank module 70 is retrieved for filling.

Figure 23:
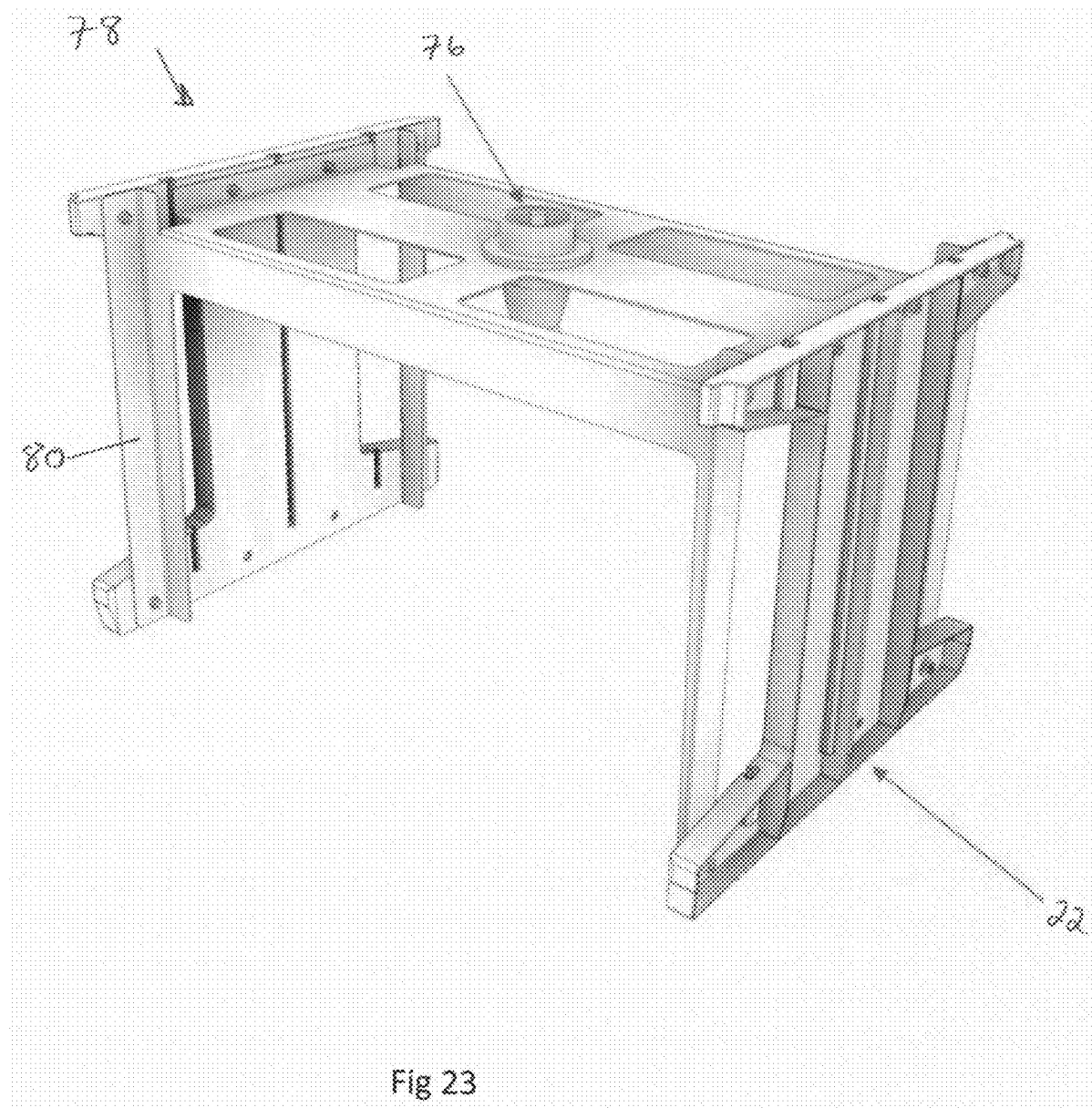
FIG. 23 is a perspective view of a spacer module, illustrating an actuator for a valve of a growth module when stacked on top and a drainage nozzle to collect draining water, both provided on a cross-member that holds the side support members in a spaced apart and parallel configuration.

As can be appreciated, the water collection trough 60 of the lowermost growth board 16 of a stack may become completely filled with water seeping down through the stack. The watering system according to one aspect thus provides a drainage nozzle 76 that is arranged to activate the valve 56 of the lowermost collection trough 60 and lead excess water away to be disposed of, or collected and reused. In one embodiment, drainage nozzle 76 is arranged in a spacer module 78 as shown in FIG. 23. A plurality of spacer modules 78 arranged in a row of columns containing plants will form a passageway in which may be arranged drain pipes connected to drainage nozzle 76, ventilation ducts, electrical wiring or other infrastructure equipment. According to a preferred embodiment, the spacer module 78 comprises two side support members 22, between which is mounted an extension bracket 80 that holds the nozzle 76 in a raised position. In a preferred embodiment, extension bracket 80 is identical with water tank bracket 72, merely installed upside down. Likewise, drainage nozzle 76 may be the same component as water tank valve, comprising both a sealing means and an activation pin. In this preferred embodiment, the various components of the stackable module, the water tank module and the spacer module are all interchangeable and modular, with the manufacturing and logistical advantages that such modularity provides.

Complete Vertical Farming System

Figure 25:
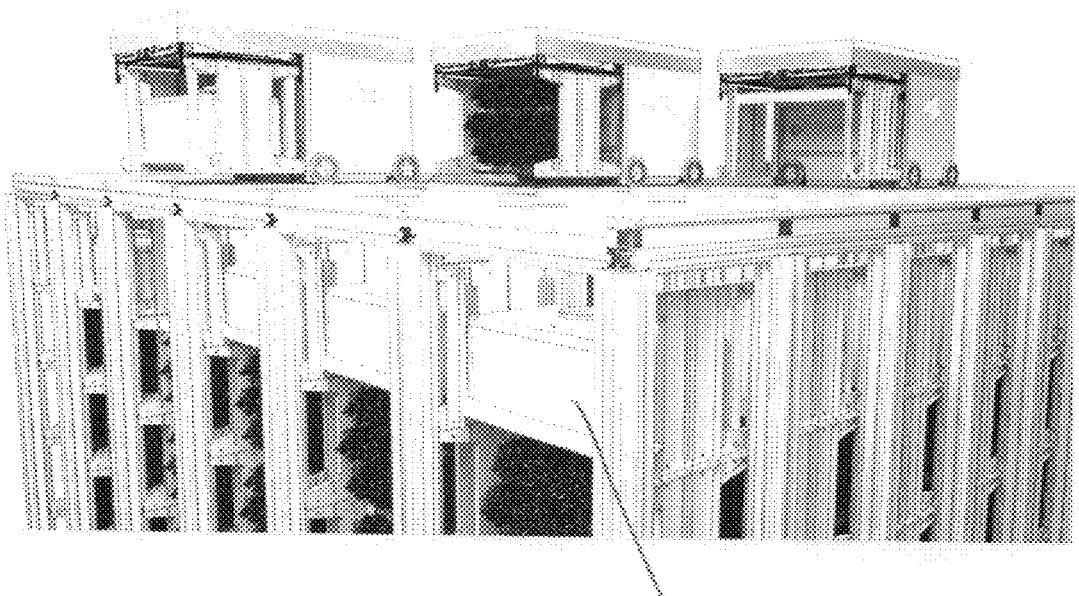

According to another aspect the invention provides a complete vertical farming system and method, as illustrated in FIGS. 24, 25 and 26. In a preferred embodiment, the vertical farming system comprises the stackable module, growth board and watering system described above, implemented in the infrastructure of an automated storage and retrieval system. Plants are grown in the growth media supported in the stackable modules. A plurality of such stackable modules are arranged in stacks in storage columns of the framework structure 100. Lighting and/or ventilation is provided to the plants from the side of the storage columns, made possible by the fact that the plants grow horizontally out from the growth boards, which do not have side walls that block light or airflow. The container handling vehicles of the system place the stackable module in storage columns to form the stacks, as well as transporting water tank modules 70 to the top of the stacks. The container handling vehicle retrieve and transport the stackable modules to a harvest location at an appropriate time, which activity may be directed automatically by the control system 500. Water flowing out of the bottom of the stack is collected and recycled. The vertical farming system of the present invention can thus be implemented with relative simplicity in an automated storage and retrieval installation, as many of the components of the system are modular and simple to manufacture and transport. The water tank modules eliminate the need for complicated watering infrastructure to be installed in the framework. In a preferred embodiment, the sections of the frame work structure 100 may be installed in enclosed, environmentally controlled spaces based on the needs of the plants.

In the preceding description, various aspects of a vertical farming system and related components according to the invention have been described with reference to the illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

Growth Board with Drain

As illustrated in FIGS. 27-34, the invention further provides alternate embodiments of the growth board 16 comprising a drain 82. Drain 82 provides a liquid passage from the water trough 48 to the water collection trough 52 of the growth board that bypasses the porous growth medium 18. The embodiments of the growth board with drain are useful in connection with, and may comprise a part of the aspects of the invention related to the stackable module, the vertical farming watering system, and the vertical farming system employing the infrastructure of an automated storage and retrieval system as described above.

Figure 27:
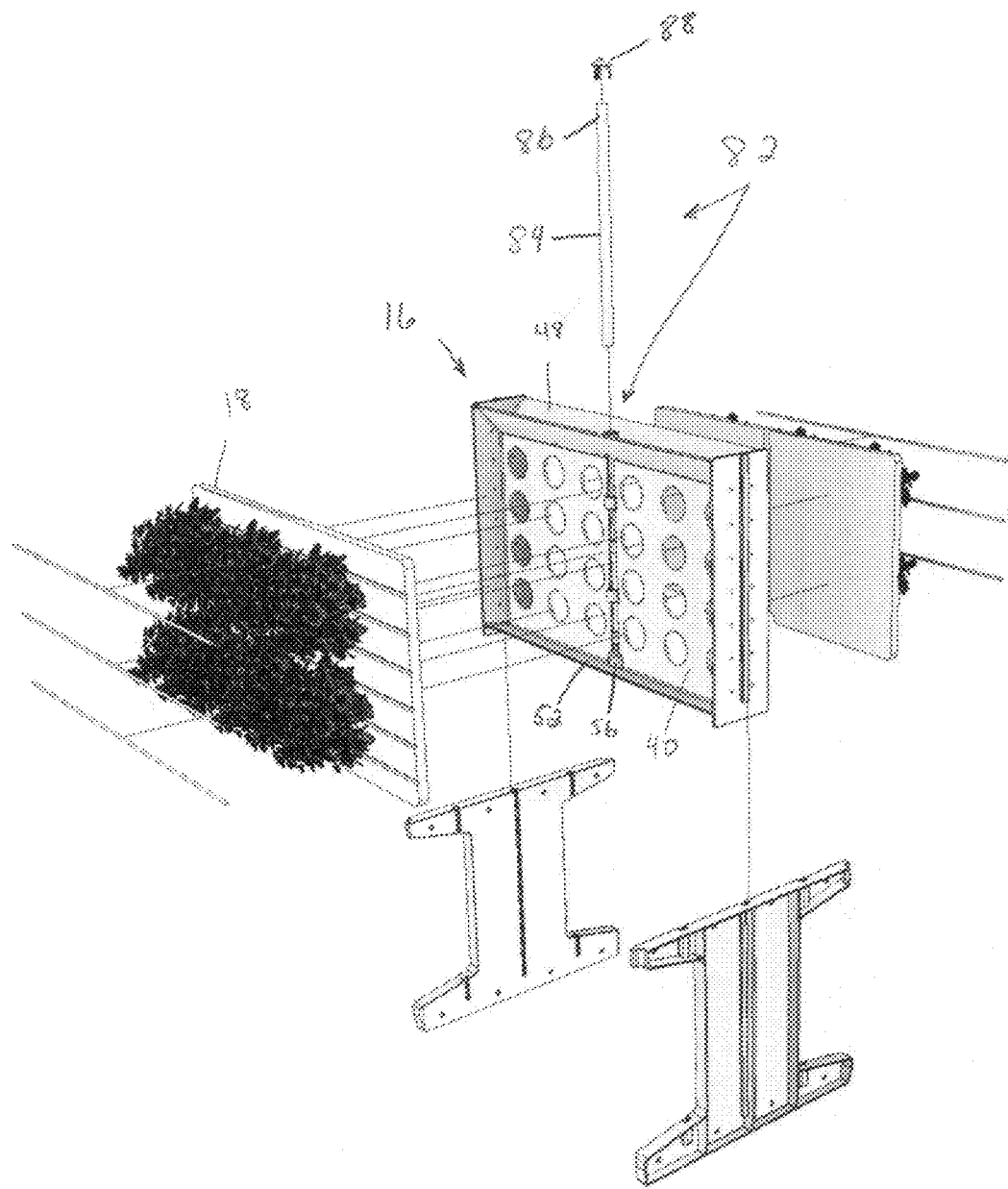
FIG. 27 is an exploded view of a stackable module comprising a first embodiment of a growth board with drain.
Figure 28:
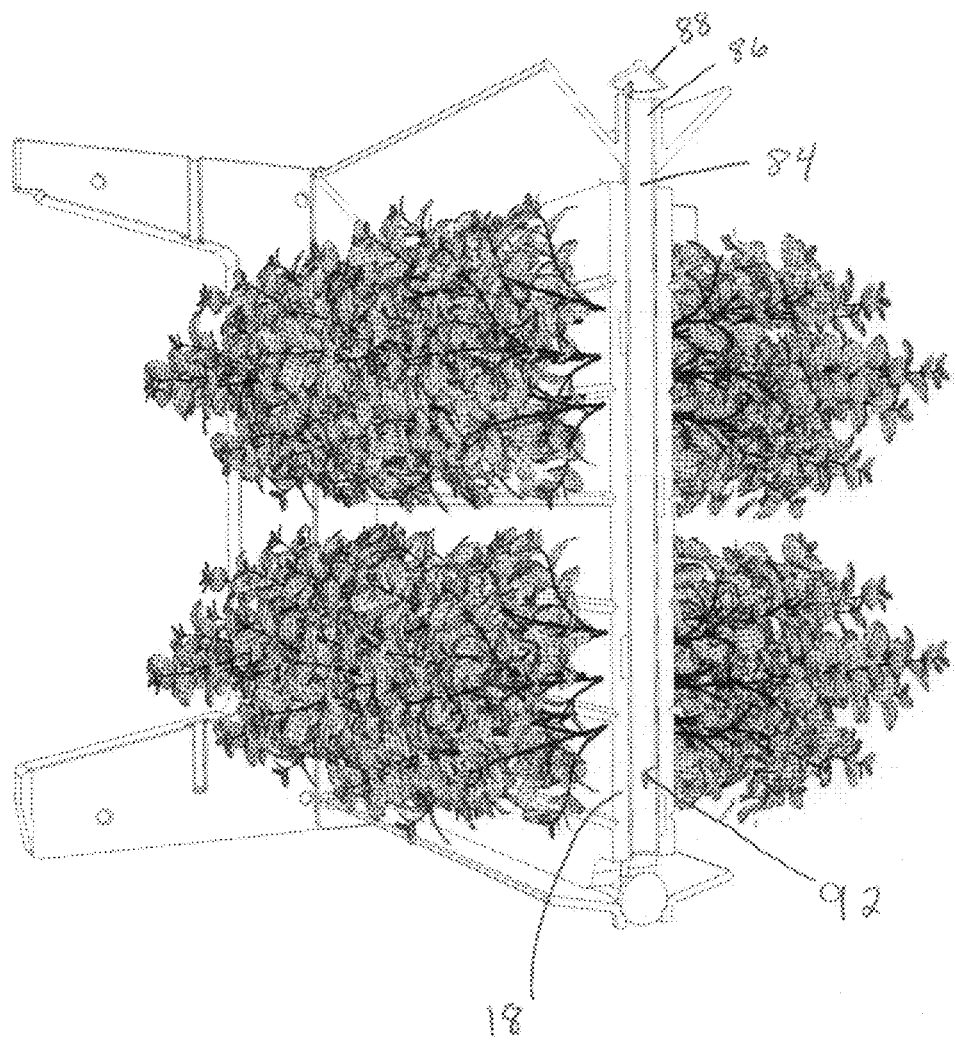
FIG. 28 is a perspective sectional view of the growth board with drain from FIG. 27.

FIG. 27 shows an exploded view of a stackable module comprising a first embodiment of a growth board 16 with drain 82. Aside from the growth board 16 with drain 82, the remaining components of the stackable module are as described above. The growth board 16 with drain 82 comprises, as described above, a vertical substrate surface 40 for supporting a porous growth medium 18, a watering trough 48, a water collection trough 52 and a valve device 56. Aside from the drain function described below, the growth board with drain functions essentially the same as the growth board without drain as described above. In the embodiment illustrated in FIG. 27, drain 82 comprises a cylindrical drain tube 84 arranged vertically along substrate 40, and extending from water trough 48 to water collection trough 52. Drain tube 84 has an upper end 86. Attached to upper end 86 is a conical deflection piece 88. As shown in FIGS. 28 and 34, upper end 86 of drain tube 84 is elevated at a distance D1 above the lowermost part of water trough 48. Conical deflection piece 88 is arranged at the upper end 86 such conical deflection piece extends above upper end 86 at a distance D2, D2 being great enough that an upper end 90 of conical deflection piece 88 is able to press ball 58 of valve device 56 of a higher stacked growth board up to the open position. As shown in FIG. 28, drain tube 84 thus creates a water passage 92 that bypasses growth medium 18.

Figure 29:
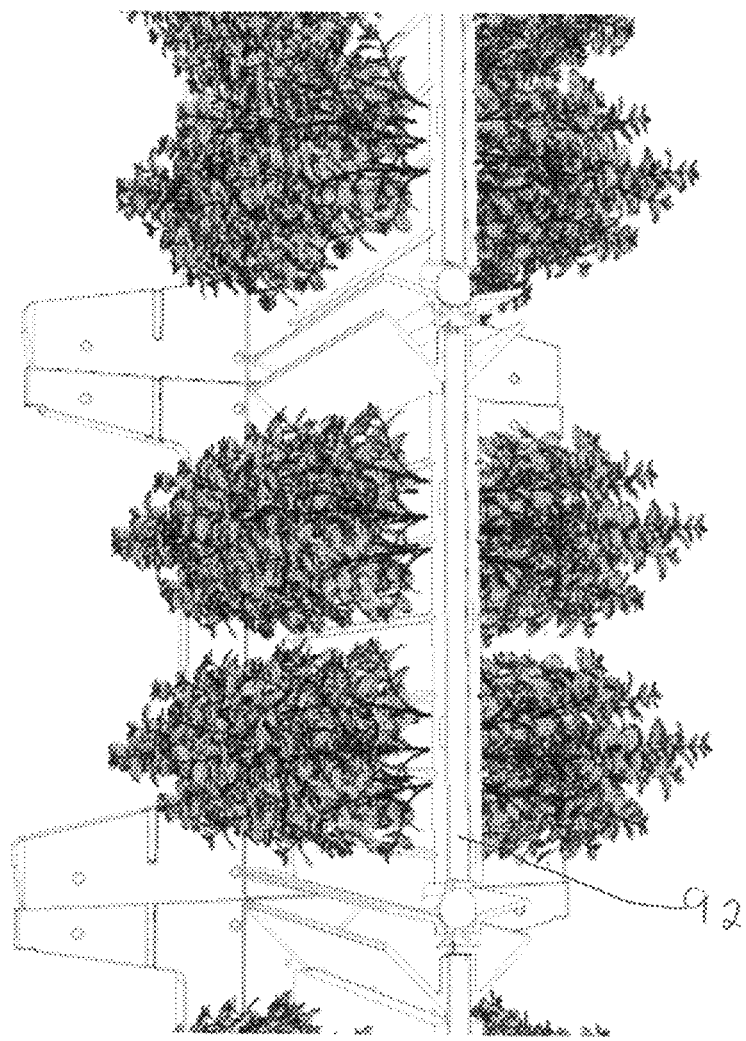
FIG. 29 is a perspective, sectional view of a stack of growth boards with drain.

FIG. 29 shows a plurality of growth boards with drain arranged in stack, with water passage 92 bypassing all of the growth mediums of the stack.

Figure 30:
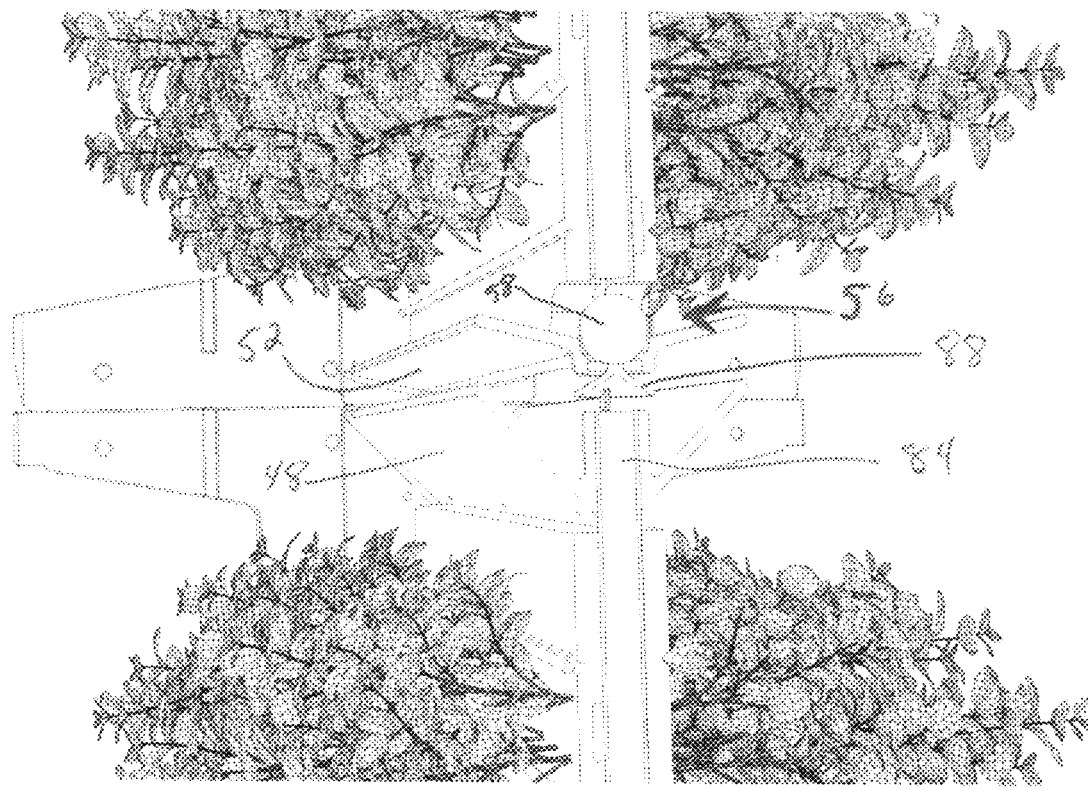
FIG. 30 is a close up view of the a growth board with drain, illustrating a conical deflector piece arranged at the top of the drain opening.

In the embodiment illustrated in FIGS. 27-30, the upper end 90 of conical deflection piece 88 functions as pin 60 to press ball 58 upwards. As shown in FIG. 30, deflection piece 88 has a diameter that is greater than the diameter of drain tube 84, such that water flowing out of valve 56 will be deflected into water trough 48.

Figure 31:
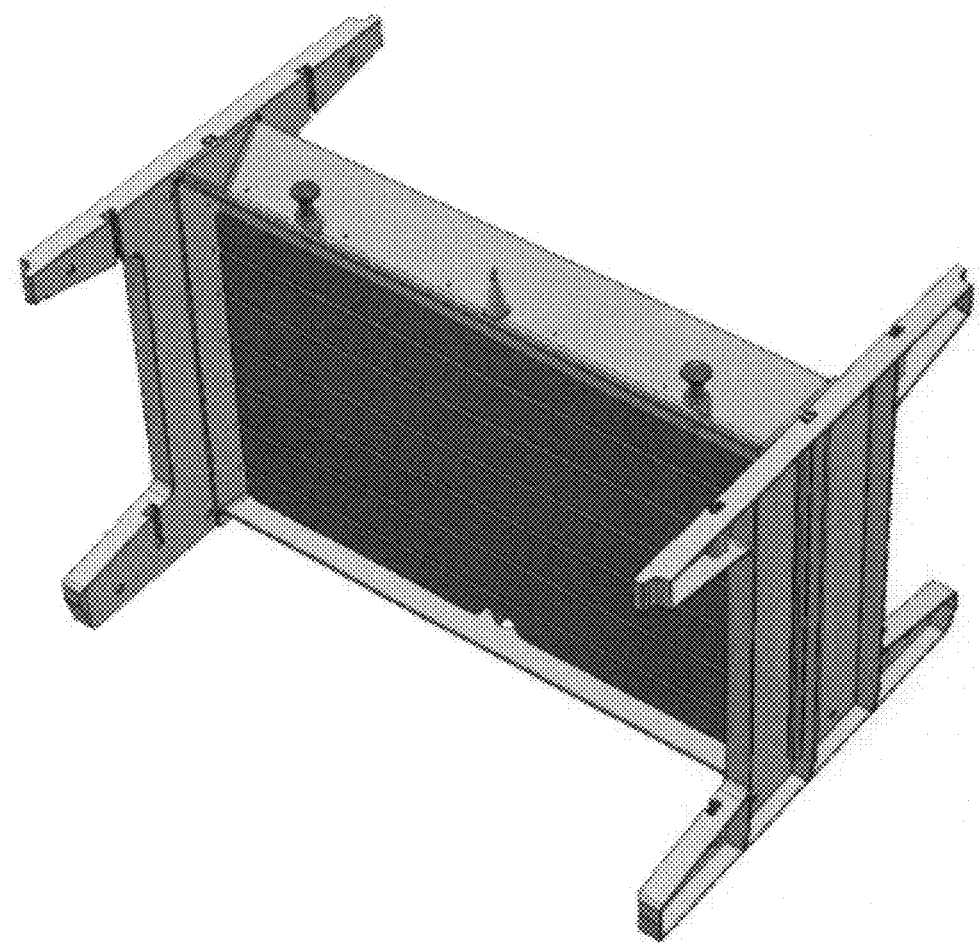
FIG. 31 is a perspective view of a second embodiment of a growth board with drain.
Figure 32:
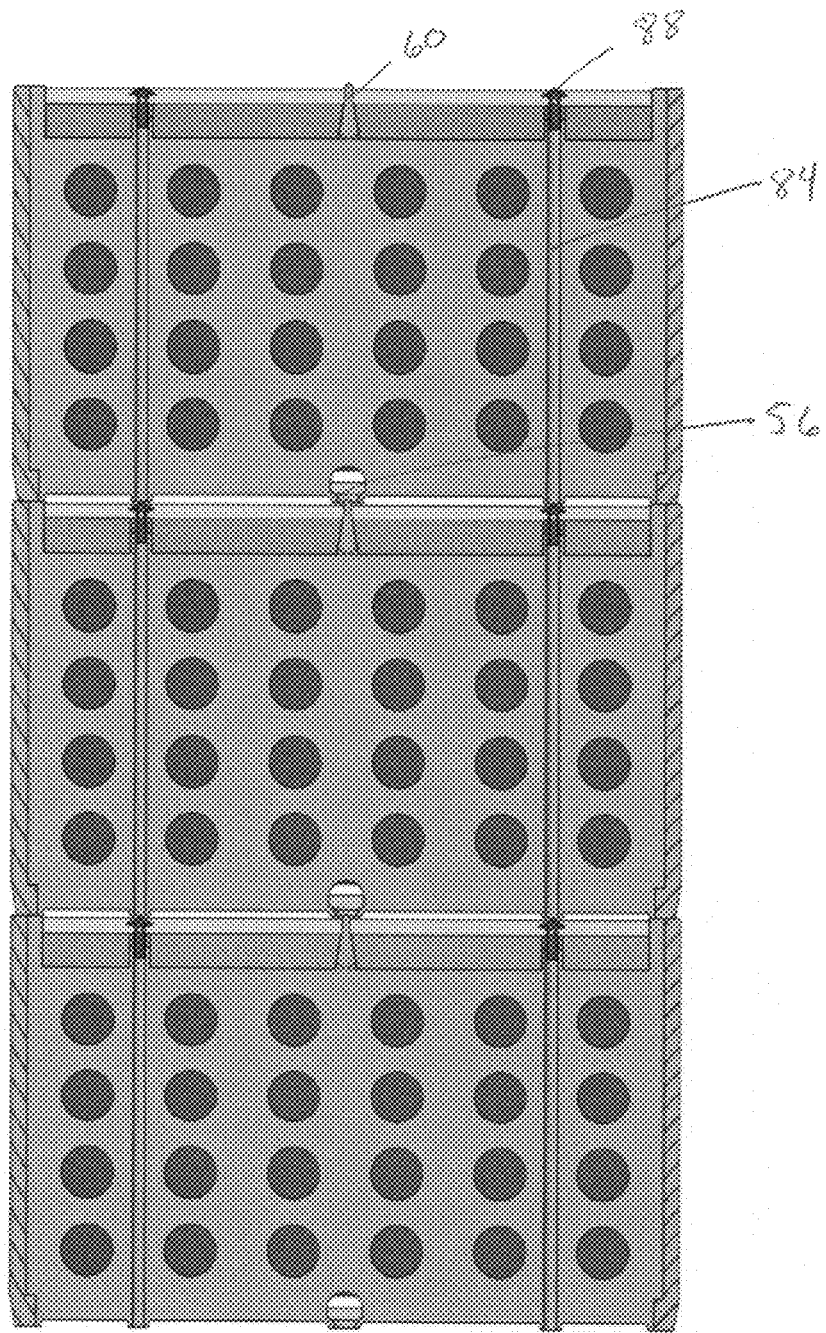
FIG. 32 is a side elevational view of a stack of growth boards from FIG. 31.
Figure 33:
FIG. 33 is a perspective view of aa conical deflector piece.

FIGS. 31 and 32 illustrate an alternate embodiment comprising drain tubes 84 that are not in vertical alignment with valve device 56. In this embodiment, Pin 60 as described above activates valve 56.

FIG. 34 illustrates that upper end 86 of drain tube 84 is elevated at a distance D1 above the lowermost part of water trough 48. Distance D1 may be selected depending upon the desired water level in trough 48 necessary for water to begin to flow into drain 84. According to one aspect, D1 is at least half the maximum height of water trough 48. D1 may also be from 25% to 75% of the height of the watering trough.

LIST OF REFERENCE NUMBERS

Prior Art (FIGS. 1-4)

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
112 Access opening
119 First port column
120 Second port column
201 Prior art container handling vehicle
201a Vehicle body of the container handling vehicle 201
201b Drive means/wheel arrangement/first set of wheels in first direction (X)
201c Drive means/wheel arrangement/second set of wheels in second direction (Y)
301 Prior art cantilever container handling vehicle
301a Vehicle body of the container handling vehicle 301
301b Drive means/first set of wheels in first direction (X)
301c Drive means/second set of wheels in second direction (Y)
304 Gripping device
401 Prior art container handling vehicle
401a Vehicle body of the container handling vehicle 401
401b Drive means/first set of wheels in first direction (X)
401c Drive means/second set of wheels in second direction (Y)

404 Gripping device
404a Lifting band
404b Gripper
404c Guide pin
404d Lifting frame
500 Control system
X First direction
Y Second direction
Z Third direction
10 Stackable module
12 Cross-member
14 Load bearing means
16 Growth board
18 Growth medium
20 Plants
22 Side support member
24 Vertical grooves
26 Upper load transferring edge surface
28 Lower load transferring edge surface
30 Notch/recess
32 Rectangular side support member
34 Spacer rod
36 Upper support member
38 Lower support member
39 Support rod
40 Vertical substrate surface
41 Attachment means
42 Perforations
43 Retaining rods
44 Frame member
46 Ridge or protrusion
48 Watering trough
50 Water distribution holes
52 Water collection trough
54 Water passage
56 Valve
58 Ball
60 Pin
70 Water tank module/water tank
72 Water tank bracket
74 Water tank valve
76 Drainage nozzle
78 Spacer module
80 Extension bracket
82 Drain
84 Drain tube
86 Upper end of drain tube
88 Deflection piece
90 Upper end of deflection piece
92 Water passage

What is claimed is:

1. A stackable growth module comprising a vertically arranged growth board having a vertical surface for supporting plants, the growth board comprising:
a porous growth medium supported by the vertical surface;
a watering trough arranged along an upper edge of the growth board, the watering trough having water distribution holes for distributing water to the growth medium;
a water collection trough arranged along a lower edge of the growth board to collect water draining from the growth medium, the water collection trough having a valve that is configured to open and permit water to flow out of the collection trough when the valve is an open position and which prevents water from flowing out of the collection trough when the valve is in a closed position, and
a drain comprising a liquid passage from the watering trough to the water collection trough, said liquid passage bypassing the porous growth medium, the drain having an inlet within the watering trough, the inlet being elevated at a distance D1 above a lowest point in the watering trough;
the stackable growth module comprising a load-bearing frame comprising a first support member and a second support member held in a spaced apart and parallel configuration by the growth board,
whereby the load-bearing frame is configured to enable the stackable growth module to occupy a cuboidal volume within which the growth board is supported,
and wherein the load-bearing frame comprises upper and lower load-transferring edge surfaces.

2. A stackable growth module according to claim 1, wherein the valve comprises a liftable sealing member, and wherein the growth board comprises a protruding body projecting upwardly above the upper edge of the growth board, the protruding body being in axial alignment with the sealing member, wherein the projecting body of a lower growth module among a plurality of growth modules in a stack is configured to push up the sealing member of the valve of an upper growth module of the stack.

3. A stackable growth module according to claim 2, wherein the drain comprises a drain tube arranged along the vertical surface of the growth board, and wherein the drain tube is in axial alignment with the valve and the protruding body is an upper end, or a piece connected to an upper end of the drain tube.

4. A stackable growth module according to claim 3, wherein a water deflection piece in a shape of a cone is arranged at the upper end of the drain tube, base of the cone having a diameter greater than the diameter of the drain tube, and an upper end of the cone being or forming a part of the protruding body.

5. A stackable growth module according to claim 1, wherein the drain comprises a drain tube arranged along the vertical surface of the growth board.

6. A stackable growth module according to claim 1, wherein the distance D1 is from 25% to 75% of a height of the watering trough.

7. A stackable growth module according to claim 1, wherein the growth board is a functional component of a vertical farming system.

8. A stackable growth module according to claim 1, wherein the upper load-transferring edge surface is provided with recesses arranged to be engaged by a gripping mechanism of a module handling vehicle of a vertical farming facility.

9. A stackable growth module according to claim 1, wherein the first support member and the second support member are each side support members, optionally in a form of a strut, and optionally wherein the side support members have an I-shaped outline.

10. A stackable growth module according to claim 9, wherein each of the side support members comprises a vertical guide, optionally configured as a slot, for receiving a portion of the growth board.

* * * * *